US011873053B2

(12) United States Patent
 Ozaki et al.

(10) Patent No.: US 11,873,053 B2
(45) Date of Patent: Jan. 16, 2024

(54) CONTROL DEVICE FOR MOBILE BODY

(71) Applicant: Honda Motor Co., Ltd., Tokyo (JP)

(72) Inventors: Kazumasa Ozaki, Saitama (JP);
 Shinya Shirokura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 341 days.

(21) Appl. No.: 17/335,067

(22) Filed: May 31, 2021

(65) Prior Publication Data
 US 2021/0371037 A1 Dec. 2, 2021

(30) Foreign Application Priority Data
 Jun. 2, 2020 (JP) .................................. 2020-095847

(51) Int. Cl.
 *B62K 11/00* (2006.01)
 *B60L 15/20* (2006.01)
(52) U.S. Cl.
 CPC ............. *B62K 11/007* (2016.11); *B60L 15/20* (2013.01); *B60L 2200/16* (2013.01); *B60L 2200/34* (2013.01); *B60L 2240/22* (2013.01); *B60L 2260/34* (2013.01); *B60L 2260/42* (2013.01); *B60L 2260/44* (2013.01)
(58) Field of Classification Search
 CPC ...... B62K 11/007; B01L 5/20; B01L 2200/16; B01L 2200/34; B01L 2260/34
 See application file for complete search history.

(56) References Cited

U.S. PATENT DOCUMENTS

| 8,862,301 B2 | 10/2014 | Araki et al. |
| 2013/0304316 A1* | 11/2013 | Takenaka ................. B62K 1/00 701/36 |
| 2013/0304321 A1* | 11/2013 | Takenaka .............. B60B 19/003 701/41 |
| 2014/0297127 A1* | 10/2014 | Araki .................... G05D 1/0268 701/41 |

(Continued)

FOREIGN PATENT DOCUMENTS

| JP | 2002085473 | 3/2002 |
| JP | 2013237335 | 11/2013 |

(Continued)

OTHER PUBLICATIONS

"Office Action of Japan Counterpart Application" with English translation thereof, dated Jun. 20, 2023, p. 1-p. 4.

*Primary Examiner* — Tony H Winner
(74) *Attorney, Agent, or Firm* — JCIPRNET

(57) ABSTRACT

The disclosure provides a control device capable of smoothly performing a turning operation due to an external force for a mobile body having a movement operation part and a seat part of occupant. A control device which performs a movement control of movement operation parts a mobile body estimates a movement rotational force in the yaw direction according to a movement of the mobile body and a rotational driving force in the yaw direction according to a driving forces of an actuator, and estimates an external force rotational force, which is a rotational force in the yaw direction due to an external force applied to the mobile body, based on these estimation values. A turning operation of the mobile body is performed according to an estimation value of the external force rotational force and a maneuver operation of the mobile body.

18 Claims, 9 Drawing Sheets

(56) References Cited

U.S. PATENT DOCUMENTS

2018/0304954 A1* 10/2018 Murakami ............... B62J 45/42
2021/0197918 A1* 7/2021 Goto .................... B62K 11/007

FOREIGN PATENT DOCUMENTS

| JP | 2015093651 | 5/2015 |
| JP | 2019166863 | 10/2019 |
| WO | 2008132778 | 11/2008 |
| WO | 2008132779 | 11/2008 |
| WO | 2010061498 | 6/2010 |

* cited by examiner

CONTROL DEVICE FOR MOBILE BODY

CROSS-REFERENCE TO RELATED APPLICATION

This application claims the priority benefit of Japan application serial no. 2020-095847, filed on Jun. 2, 2020. The entirety of the above-mentioned patent application is hereby incorporated by reference herein and made a part of this specification.

BACKGROUND

Technical Field

The disclosure relates to a control device for a mobile body.

Description of Related Art

Conventionally, as seen in Patent Documents 1 and 2, for example, there is known an inverted pendulum type mobile body having a structure in which a seat part of an occupant is tiltably assembled on a base to which a movement operation part such as a wheel movable on a floor surface is assembled. In this type of inverted pendulum type mobile body, to maintain the balance of the overall center of gravity like an inverted pendulum, the posture of the seat part of the occupant is stabilized, and the movement control of the movement operation part is performed via an actuator such as an electric motor according to a maneuver operation (a movement request) such as the movement of the upper body of the occupant.

Further, conventionally, a mobile body such as an electric wheelchair, which allows the occupant to perform a maneuver operation by using a remote controller or the like, is also generally known.

RELATED ART

Patent Document

[Patent Document 1] International Publication No. 2010/061498
[Patent Document 2] Japanese Laid-open No. 2015-093651

In the above-mentioned mobile body, the movement control of the movement operation part is performed according to the maneuver operation by the occupant. Further, particularly in the inverted pendulum type mobile body, the movement control of the movement operation part is performed so as to stabilize the posture of the seat part even if the occupant does not consciously perform the maneuver operation.

In addition, for example, in a situation where the occupant of the mobile body cannot smoothly perform the maneuver operation of the mobile body or the like, in some cases, an attendant or the like of the occupant of the mobile body may apply an external force to the mobile body to make the mobile body turn (including a change of direction) without depending on the maneuver operation of the occupant. Alternatively, in some cases, the occupant may try to turn the mobile body while holding on to a handrail without performing a normal maneuver operation, or the occupant may try to turn the mobile body by kicking the floor surface with his/her foot.

However, in the conventional mobile body, the movement control of the movement operation part is performed according to the normal maneuver operation by the occupant. Therefore, even if one tries to turn the mobile body by an external force as described above, the actuator for driving the movement operation part is controlled so that the movement operation part operates in a state corresponding to the normal maneuver operation or in a state corresponding to the posture of the seat part of the occupant. Therefore, even if one tries to turn the mobile body by applying an external force to the mobile body, it tends to be difficult to smoothly turn the mobile body.

The disclosure has been made in view of such a background, and the disclosure provides a control device capable of smoothly performing a turning operation due to an external force for a mobile body having a movement operation part and a seat part of an occupant.

SUMMARY

In a control device for a mobile body according to the disclosure, the mobile body includes a movement operation part that is movable on a floor surface, an actuator that drives the movement operation part, a seat part for occupant, and a base to which the movement operation part, the actuator and the seat part are assembled; the control device executes a movement control of the movement operation part of the mobile body via the actuator according at least to a maneuver operation by an occupant riding on the seat part, and control device includes:

a movement rotational force estimation part that obtains observation data of a movement state of the mobile body and estimates a movement rotational force, which is a rotational force balanced with an inertial force in the yaw direction caused by a movement of the mobile body, based on the observation data;

a rotational driving force estimation part that obtains observation data of a driving force output by the actuator or a state quantity related to the driving force and estimates a rotational driving force in the yaw direction applied from the actuator to the movement operation part based on the observation data;

an external force rotational force estimation part that estimates an external force rotational force, which is a rotational force due to an external force applied to the mobile body, by using the movement rotational force estimated by the movement rotational force estimation part and the rotational driving force estimated by the rotational driving force estimation part; and a movement control part that performs the movement control of the movement operation part via the actuator so that a turning operation of the movement operation part is performed according to the external force rotational force estimated by the external force rotational force estimation part and the maneuver operation by the occupant (a first aspect).

DESCRIPTION OF THE EMBODIMENTS

Figure 1:
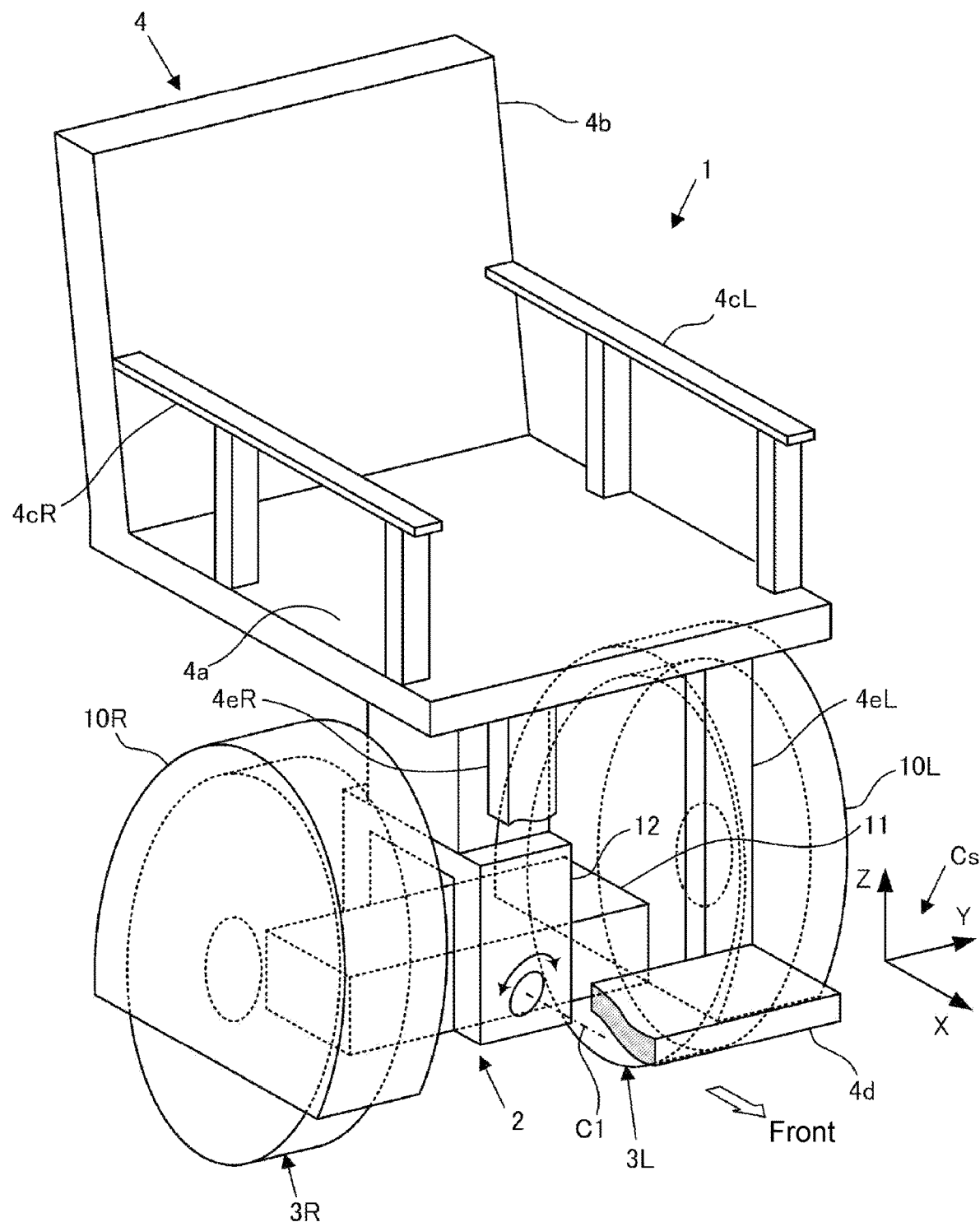
FIG. 1 is a perspective view showing a schematic configuration of a mobile body according to an embodiment of the disclosure.

Further, in the disclosure, the "yaw direction" means the direction around the axis in the up-down direction (the vertical direction or a substantially vertical direction). Further, the "observation data" means a detection value obtained by detecting any state quantity of an observation object by an appropriate sensor, or an estimation value estimated based on the correlation from a detection value of one or more other state quantities having a certain correlation with the state quantity, or a pseudo estimation value that can be considered to match or substantially match the actual value of the state quantity. In this case, the target value of the state quantity can be used as the "pseudo estimation value."

According to the first aspect, after estimating the movement rotational force and the rotational driving force of the mobile body in the yaw direction, the external force rotational force in the yaw direction may be estimated by using these estimation values; therefore, the external force rotational force may be estimated with high reliability.

Therefore, by performing the movement control of the movement operation part via the actuator so that the turning operation of the movement operation part is performed according to the external force rotational force and the maneuver operation by the occupant, it is possible to smoothly perform not only the turning operation of the mobile body according to the maneuver operation by the occupant but also the turning operation of the mobile body due to an external force. That is, if the attendant of the occupant of the mobile body or the like applies an external force to the mobile body to try to turn the mobile body, the movement control of the movement operation part of the mobile body may be appropriately performed so that the mobile body is turned accordingly. Therefore, according to the disclosure, it is possible to smoothly perform the turning operation of the mobile body due to an external force.

In the first aspect, it is preferable that the external force rotational force estimation part is configured to obtain an estimation value of the external force rotational force by: a process of obtaining a difference between the movement rotational force estimated by the movement rotational force estimation part and the rotational driving force estimated by the rotational driving force estimation part, or a value obtained by executing a low-pass characteristic filtering process on the difference, as a basic value of the external force rotational force; and a dead zone process of setting the estimation value of the external force rotational force to zero when the basic value is a value within a predetermined dead zone and setting a value determined according to a deviation amount of the basic value as the estimation value of the external force rotational force when the basic value is a value deviating from the dead zone (a second aspect).

Here, although the basic value, which is the difference between the movement rotational force estimated by the movement rotational force estimation part and the rotational driving force estimated by the rotational driving force estimation part or the value obtained by executing the low-pass characteristic filtering process on the difference, is substantially close to the actual value of the external force rotational force, the basic value tends to include a noise component.

Therefore, in the second aspect, the above-described dead zone process is executed on the basic value to determine the external force rotational force. In this way, in a situation where the noise component included in the basic value may be considered large (a situation where the basic value is a value within the dead zone), it is possible to prevent an inappropriate movement control of the movement operation part according to the noise component included in the basic value.

In the second aspect, it is preferable that the external force rotational force estimation part is configured to further have a function of variably setting the dead zone according to observation data of a yaw rate of the mobile body (a third aspect).

According to this, it is possible to compensate for the influence of the frictional force generated between the movement operation part and the floor surface according to the yaw rate of the mobile body, and to estimate the external force rotational force with high reliability. As a result, it becomes possible to perform the movement control of the movement operation part by appropriately reflecting the external force rotational force.

In the first to third aspects, it is preferable that the movement control part is configured to: execute an operation control of the actuator according to a target turning speed of the mobile body determined according to the maneuver operation by the occupant in a state without external force where the external force rotational force estimated by the external force rotational force estimation part is zero, or where the magnitude of the external force rotational force is less than a predetermined value, and execute the operation control of the actuator according to the target turning speed of the mobile body determined according to the external force rotational force in a state with external force where the external force rotational force estimated by the external force rotational force estimation part is not zero, or where the magnitude of the external force rotational force is greater than a predetermined value (a fourth aspect).

According to this, in the state without external force, the operation control of the actuator is executed according to the target turning speed determined according to the maneuver operation by the occupant; therefore, the movement control of the movement operation part may be executed appropriately according to the maneuver operation. Further, in the state with external force, the operation control of the actuator is executed according to the target turning speed determined according to the external force rotational force; therefore, the movement control of the movement operation part may be executed appropriately according to the external force rotational force.

In the fourth aspect, it is preferable that the movement control part is configured to execute the operation control of the actuator according to the target turning speed while determining the target turning speed of the mobile body to be gradually changed when the state of the external force rotational force estimated by the external force rotational force estimation part changes from one of the state without external force and the state with external force to the other (a fifth aspect).

According to this, when the state of the external force rotational force changes from one of the state without external force and the state with external force to the other, the behavior of the movement operation part can be changed smoothly.

In the first to fifth aspects, it is preferable that the mobile body is an inverted pendulum type mobile body including a plurality of the movement operation parts that are movable in all directions on the floor surface and the riding part that is assembled to the base to be tiltable in the vertical direction (a sixth aspect).

According to this, it is possible to realize that the inverted pendulum type mobile body in which multiple movement operation parts contact the floor surface is turned by an external force smoothly.

An embodiment of the disclosure will be described below with reference to FIGS. 1-9. With reference to FIG. 1, a mobile body 1 of the embodiment is, for example, an inverted pendulum type mobile body. The mobile body 1 includes a base 2, a pair of left and right movement operation parts 3L and 3R that are movable on the floor surface in all directions, and a seat part 4 on which an occupant of the mobile body 1 rides.

Here, in the description of the embodiment, a reference numeral to which "L" is added represents a component on the left side of the mobile body 1 facing the front or a state quantity related thereto, and a reference numeral to which "R" is added represents a component on the right side of the mobile body 1 facing the front or a state quantity related thereto. However, when it is not necessary to distinguish between left and right, the addition of "L" and "R" may be omitted. Further, the "floor surface" is not limited to the floor surface in the usual sense, and may be the ground, the road surface, or the like.

Figure 2:
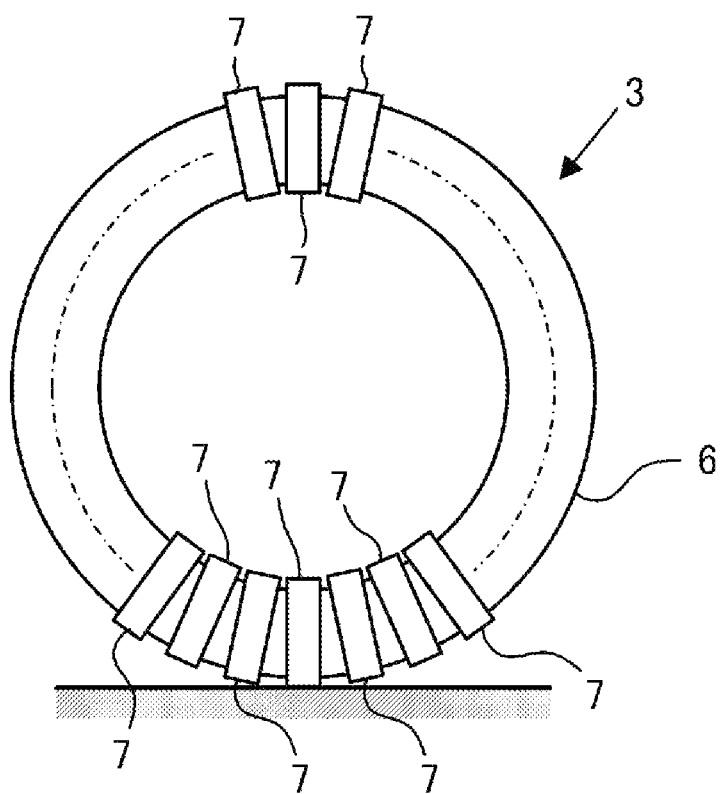
FIG. 2 is a side view showing a configuration of a main part of a movement operation part provided in the mobile body of the embodiment.

The movement operation parts 3L and 3R have the same structure. In the embodiment, each movement operation part 3 is a wheel-shaped movement operation part as seen in, for example, Patent Document 2 and the like. To schematically describe the configuration of each movement operation part 3, as shown in FIG. 2, each movement operation part 3 includes an annular core body 6 and multiple annular rollers 7 attached to the core body 6 and arranged at equal angular intervals in the circumferential direction of the core body 6, and contacts the floor surface via the rollers 7.

Then, each movement operation part 3 is able to move in all directions on the floor surface by performing both or one of the rotational driving of the core body 6 and the rotational driving of the rollers 7. Since the detailed configuration of the movement operation parts 3 is described in detail in Patent Document 2 and the like, detailed description will be omitted in the disclosure.

The mobile body 1 of the embodiment includes the movement operation parts 3L and 3R having such a configuration at an interval in the left-right direction of the mobile body 1. In this case, the left movement operation part 3L and the right movement operation part 3R are disposed so that the axes (rotational axes) of the respective core bodies 6 extend coaxially in the left-right direction of the mobile body 1.

In the following description, as shown in FIG. 1, a 3-axis Cartesian coordinate system Cs with the front-rear direction of the mobile body 1 as the X-axis direction, the left-right direction of the mobile body 1 as the Y-axis direction, and the up-down direction (the vertical direction or a substantially vertical direction) as the Z-axis direction is assumed. The X-axis direction, the Y-axis direction, and the Z-axis direction mean each coordinate axis direction of the coordinate system Cs unless otherwise specified.

In this case, the X-axis direction (the front-rear direction of the mobile body 1) is the direction in which the movement operation parts 3L and 3R roll when the respective core bodies 6 of the movement operation parts 3L and 3R in a state of standing on the floor surface are rotationally driven at a constant speed, and the Y-axis direction (the left-right direction of the mobile body 1) is the axial center direction of the core bodies 6 of the movement operation parts 3L and 3R in the standing state. Further, in the description of the embodiment, the positive direction of the X-axis is the front direction of the mobile body 1; the positive direction of the Y-axis is the left direction of the mobile body 1; and the positive direction of the Z-axis is the upward direction. Further, the direction around the X-axis, the direction around the Y-axis, and the direction around the Z-axis are referred to as the roll direction, the pitch direction, and the yaw direction, respectively.

The base 2 has cover parts 10L and 10R covering the upper parts of the movement operation parts 3L and 3R contacting the floor surface, and a main body part 11 disposed between the cover parts 10L and 10R. The cover parts 10L and 10R are fixed (or integrally formed) respectively to the left and right ends of the main body part 11. In addition, the annular core bodies 6 of the movement operation parts 3L and 3R are axially supported respectively by the cover parts 10L and 10R so that they are rotatable with respect to the base 2 around the axis thereof. Therefore, in the state where the movement operation parts 3L and 3R contact the floor surface, the base 2 is swingable in the pitch direction around the axes of the respective core bodies 6 of the movement operation parts 3L and 3R with respect to the floor surface.

Further, the base 2 has a pedestal 12 axially supported by the main body part 11 to be swingable around an axis Cl in the front-rear direction (the X-axis direction) with respect to the main body part 11, and the seat part 4 is attached to the pedestal 12.

In the embodiment, the seat part 4 is a chair-shaped seat part having a seat 4a, a backrest 4b, and left and right armrests 4cL and 4cR, and the seat 4a is fixed to the upper end of the pedestal 12. Therefore, the seat part 4, together with the pedestal 12, is tiltable in the roll direction around the axis Cl with respect to the main body part 11 of the base 2.

Further, the seat part 4 has a footrest 4d on which an occupant seated on the seat 4a rests his/her feet. The footrest 4d, for example, extends in the left-right direction and is attached to the lower ends of a pair of left and right links 4eL and 4eR disposed and extending downward from the front end of the lower surface of the seat 4a.

In addition, the footrest 4d may be divided into a footrest for the left foot of the occupant and a footrest for the right foot of the occupant. Further, the links 4eL and 4eR may be provided with a mechanism for adjusting the vertical distance between the seat 4a and the footrest 4d.

In the embodiment, the seat part 4 is assembled to the base 2 via the pedestal 12 as described above. Therefore, in a state where the movement operation parts 3L and 3R contact the floor surface, the seat part 4 is tiltable, together with the base 2, in the pitch direction around the axes of the respective core bodies 6 of the movement operation parts 3L and 3R with respect to the floor surface, and the seat part 4 is also tiltable, together with the pedestal 12, in the roll direction around the axis Cl in the front-rear direction.

In more detail, the seat part 4 is not limited to a chair type. For example, the seat part 4 may be a structure that does not include the backrest 4b or the armrests 4cL and 4cR, or may be a saddle-shaped seat that is configured so that the occupant may straddle and sit on it. Further, the seat part 4 may be attached to the pedestal 12 to be movable up and down with respect to the base 2, for example. Further, when the seat part 4 is tilted by a predetermined amount or more, support wheels or the like contacting the floor surface may be attached around the seat 4a to prevent further tilting.

Figure 3:
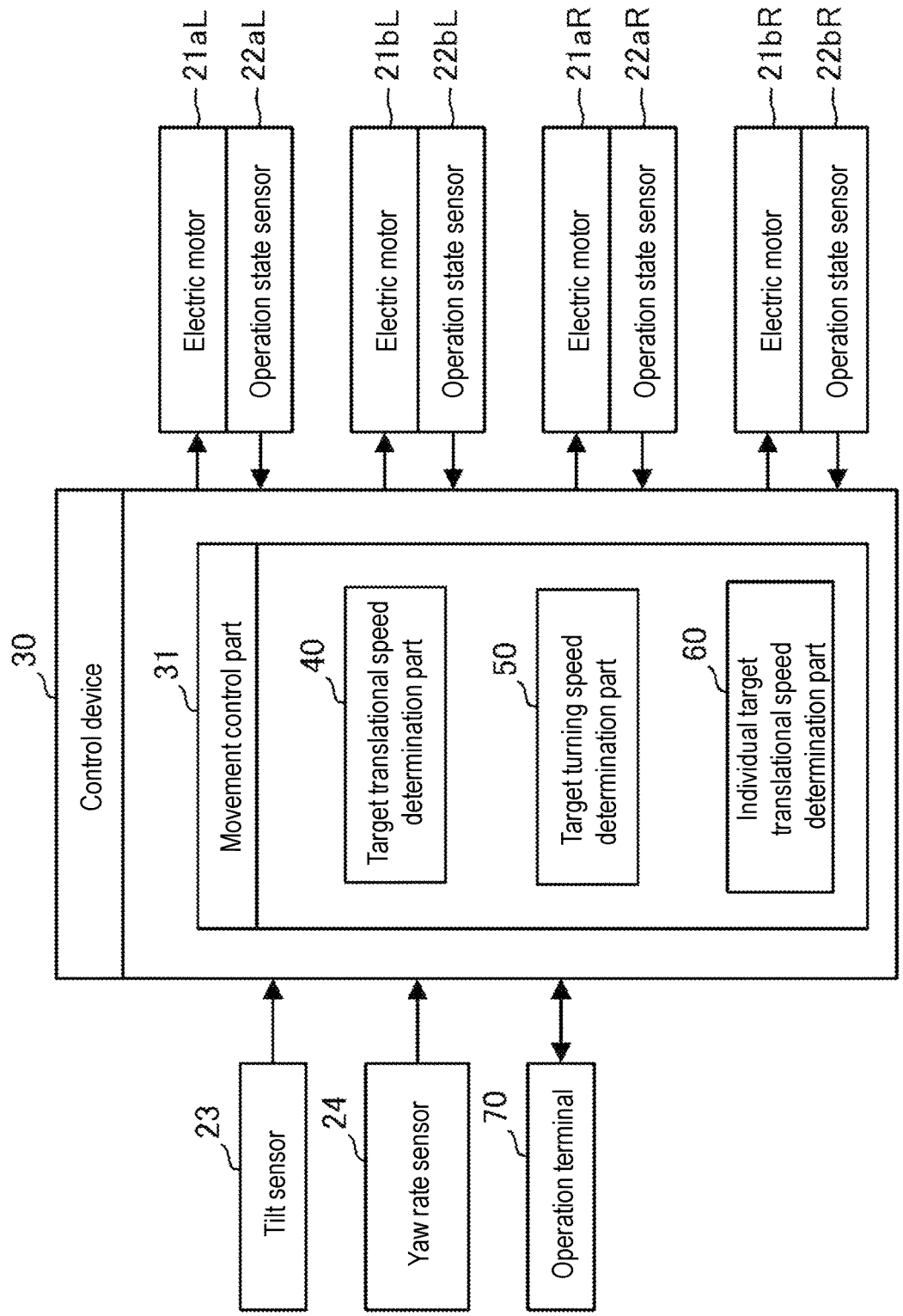
FIG. 3 is a block diagram showing a configuration related to the movement control of the mobile body of the embodiment.

As shown in FIG. 3, the mobile body 1 includes two electric motors 21aL and 21bL as actuators for driving the movement operation part 3L; two electric motors 21aR and 21bR as actuators for driving the right movement operation part 3R; operation state sensors 22aL, 22bL, 22aR and 22bR provided for each of the electric motors 21aL, 21bL, 21aR and 21bR for detecting the operation state of each of the electric motors 21aL, 21bL, 21aR and 21bR; a tilt sensor 23 for detecting the tilt angle of the seat part 4 (=the tilt angle of the pedestal 12); a yaw rate sensor 24 for detecting the yaw rate (the angular velocity in the yaw direction) of the mobile body 1; and a control device 30 having a function of controlling the operation of the movement operation parts 3L and 3R.

In the following description, when it is not necessary to distinguish the electric motors 21a and 21b for driving each of the movement operation parts 3, each of the electric motors 21a and 21b is simply referred to as the electric motor 21. Similarly, when it is not necessary to distinguish the operation state sensors 22a and 22b corresponding to each of the electric motors 21a and 21b for driving each of the movement operation parts 3, each of the operation state sensors 22a and 22b is simply referred to as the operation state sensor 22.

The electric motors 21a and 21b for driving each of the movement operation parts 3 are mounted on the base 2 so that the rotational driving force may be transmitted to the core bodies 6 and each of the rollers 7 of the movement operation parts 3 via a power transmission mechanism (not shown). For the power transmission mechanism, the one described in Patent Document 2 or the like may be adopted.

In this case, power is transmitted from the electric motors 21a and 21b to the movement operation parts 3 so that the rotation speed of the core body 6 of each of the movement operation parts 3 (and thus the X-axis direction movement speed of the movement operation parts 3) is proportional to the sum of the rotation speeds of the output shafts of each of the electric motors 21a and 21b corresponding to the movement operation parts 3, and the rotation speed of each of the rollers 7 of each of the movement operation parts 3 is proportional to the difference of the rotation speeds of the output shafts of each of the electric motors 21a and 21b corresponding to the movement operation parts 3.

The operation state sensor 22 corresponding to each electric motor 21 includes, for example, a current sensor (not shown) for detecting the energizing current of the electric motor 21, and a rotation sensor (not shown) for detecting the rotation angle or the rotation speed (the angular velocity) of the output shaft of the electric motor 21. In this case, the rotation sensor may be configured by, for example, a resolver, a rotary encoder, a potentiometer, or the like.

The tilt sensor 23 is configured by, for example, a known inertial measurement unit (IMU) capable of detecting the three-axis (three-dimensional) acceleration and the three-axis (three-dimensional) angular velocity, and is mounted on the seat part 4 or the pedestal 12 of the base 2. In this case, the tilt sensor 23 executes a known measurement calculation process such as a strap-down method based on the detection data of the acceleration and the angular velocity by an electronic circuit including a processor and the like (not shown), and thereby measures (estimates) the tilt angle of the seat part 4 in the roll direction (the direction around the X-axis) and the pitch direction (the direction around the Y-axis), and outputs the measurement data. Further, the above measurement calculation process may be executed by the control device 30.

The yaw rate sensor 24 is configured by a known angular velocity sensor, and is mounted on the main body part 11 of the base 2 or the like to be able to detect the yaw rate generated during the turning operation of the mobile body 1. Further, in the case where the tilt sensor 23 is configured by an inertial measurement unit, the tilt sensor 23 can also measure the yaw rate based on the detection data of the acceleration and the angular velocity by a measurement calculation process such as the strap-down method. In this case, it is not necessary to provide the yaw rate sensor 24 separately from the tilt sensor 23.

The control device 30 is configured by an electronic circuit unit including a microcomputer, a memory, an interface circuit and the like, and is mounted at any appropriate position on the mobile body 1, such as on the base 2. The measurement data (the detection data) of each operation state sensor 22, the tilt sensor 23, and the yaw rate sensor 24 is input to the control device 30. Further, the control device 30 can perform communication (wireless communication or wired communication) with an operation terminal 70 held by the occupant or the like.

The operation terminal 70 is configured by, for example, a smartphone, a tablet terminal, a feature phone, or the like, and can perform a maneuver operation on the mobile body 1 by activating a pre-installed control application. In this case, by operating the operation terminal 70, a speed command may be transmitted as a command value of the movement speed (the translational speed) of the mobile body 1 from the operation terminal 70 to the control device 30. Specifically, the speed command is configured by a speed command in the front-rear direction (the X-axis direction) and a speed command in the left-right direction (the Y-axis direction) of the mobile body 1.

Further, the operation terminal 70 may be a remote control type operation terminal including an operation part for the maneuver operation on the mobile body 1 such as a joystick. Further, the operation terminal 70 may be, for example, a terminal mounted on the armrest 4cL or 4cR of the seat part 4.

The control device 30 has a function as a movement control part 31 that executes the movement control of each of the movement operation parts 3 via the electric motors 21a and 21b corresponding to the movement operation parts 3 as a function realized by both or one of an implemented hardware configuration and a program (a software configuration). The movement control part 31 includes a function as a target translational speed determination part 40 for sequentially determining a target translational speed, which is a target value of the translational speed of the mobile body 1 (more specifically, the overall translational speed of the movement operation parts 3L and 3R); a function as a target turning speed determination part 50 for sequentially determining a target turning speed, which is a target value of the angular velocity (the yaw rate) of the mobile body 1 in the yaw direction; and a function as an individual target translational speed determination part 60 for determining the target translational speed of each of the movement operation parts 3L and 3R.

Next, a more specific process of the control device 30 and an operation of the mobile body 1 will be described. The control device 30 starts the process of the movement control part 31 according to a predetermined operation of the operation terminal 70 by the occupant seated on the seat 4a of the seat part 4. At this time, the movement control part 31 stabilizes the posture of the seat part 4 to balance the overall center of gravity of the mobile body 1 (the overall center of gravity including the occupant riding on the seat part 4) like the mass point of the inverted pendulum, and performs the movement control of the movement operation parts 3L and 3R to move the mobile body 1 according to the maneuver operation of the occupant or the like.

In addition, balancing the overall center of gravity of the mobile body 1 means that the resultant force of the gravity acting on the overall center of gravity and the inertial force generated by the movement of the overall center of gravity is balanced with the floor reaction force received by the mobile body 1 from the floor surface.

Before the control process of the movement control part 31 is specifically described, the kinetic behavior of the overall center of gravity of the mobile body 1 will be described with reference to FIGS. 4A and 4B. The kinetic behavior of the overall center of gravity of the mobile body 1 (specifically, the behavior seen from the Y-axis direction and the behavior seen from the X-axis direction) is approximately represented by the behavior of the inverted pendulum models as shown in FIGS. 4A and 4B.

In addition, in the description of the embodiment, the subscript "_x" means a reference numeral of a variable or the like when the mobile body 1 is viewed from the Y-axis direction (the left-right direction), and the subscript "_y" means a reference numeral of a variable or the like when the mobile body 1 is viewed from the X-axis direction (the front-rear direction). FIG. 4A shows the inverted pendulum model when the mobile body 1 is viewed from the Y-axis direction (when the mobile body 1 is viewed in a side view), and FIG. 4B shows the inverted pendulum model when the mobile body 1 is viewed from the X-axis direction (when the mobile body 1 is viewed from its front in a front view).

Figure 4A:
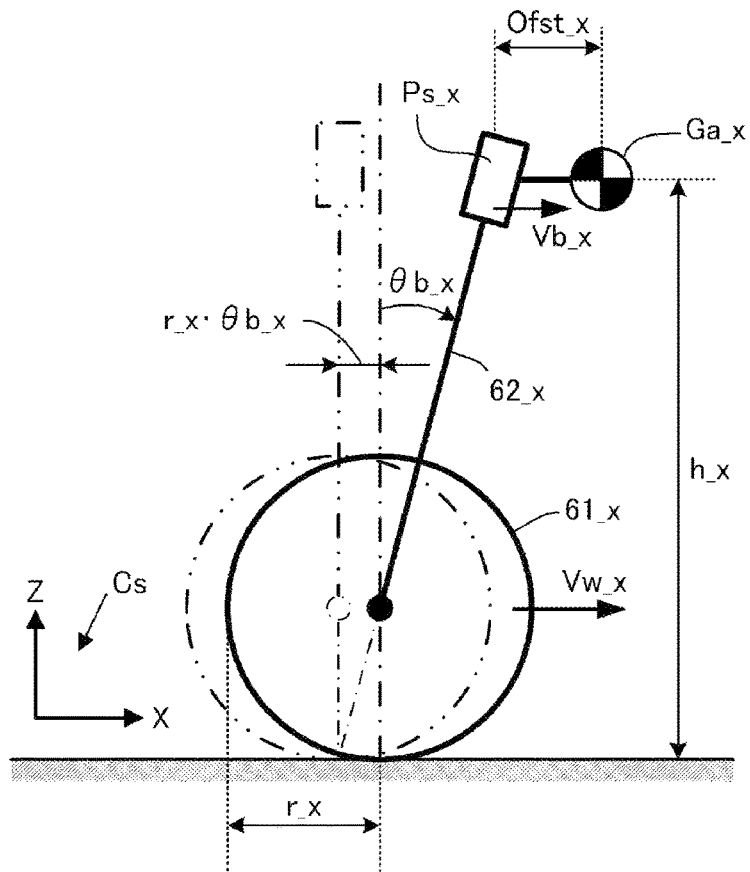
FIGS. 4A and 4B are diagrams showing inverted pendulum models related to the movement control of the mobile body of the embodiment.
Figure 4B:
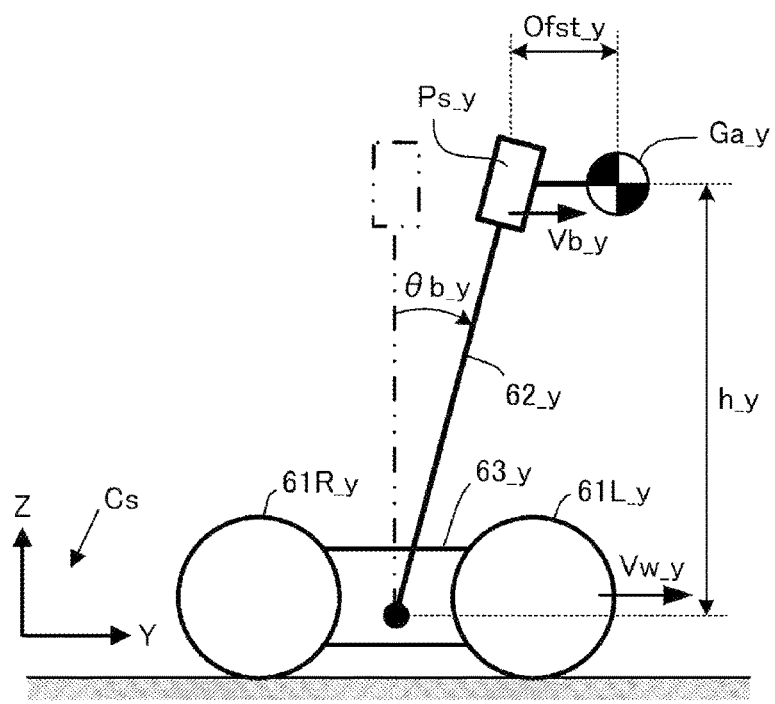

As shown in FIG. 4A, the inverted pendulum model representing the behavior of the overall center of gravity of the mobile body 1 viewed from the Y-axis direction includes a wheel 61_x, which has a rotation axis parallel to the Y-axis direction and is rollable on the floor surface in the X-axis direction; a rod 62_x which extends from the rotation center of the wheel 61_x and is swingable around the rotation axis of the wheel 61_x (in the pitch direction); and a mass point Ga_x connected to a reference part Ps_x, which is the tip end (the upper end) of the rod 62_x.

The wheel 61_x is a wheel that integrally models and represents the movement operation parts 3L and 3R which roll in the X-axis direction. Then, the radius r_x of the wheel 61_x is set to a value that matches or substantially matches the radius of the movement operation parts 3 viewed from the axial direction of the core bodies 6 of each of the movement operation parts 3. Further, the height h_x of the reference part Ps_x and the mass point Ga_x from the floor surface is set to a preset default value (constant value).

In this inverted pendulum model, the movement of the mass point Ga_x corresponds to the movement of the overall center of gravity of the mobile body 1 viewed from the Y-axis direction, and the tilt angle θb_x of the rod 62_x with respect to the vertical direction matches the tilt angle of the seat part 4 (or the base 2) in the pitch direction. Further, the X-axis direction translational movement of the movement operation parts 3L and 3R corresponds to the X-axis direction translational movement of the wheel 61_x due to rolling.

Further, the inverted pendulum model representing the behavior of the overall center of gravity of the mobile body 1 viewed from the X-axis direction includes a pair of left and right wheels 61L_y and 61R_y which have rotation axes parallel to the X-axis direction and are rollable on the floor surface in the Y-axis direction; a connection part 63_y which connects the wheels 61L_y and 61R_y; a rod 62_y which extends and is disposed from the connection part 63_y; and a mass point Ga_y connected to a reference part Ps_y, which is the tip end (the upper end) of the rod 62y.

In this case, the rod 62_y is axially supported by the connection part 63_y to be swingable in the roll direction around the X-axis-direction axis at an intermediate position between the wheels 61L_y and 61R_y. The wheels 61L_y and 61R_y are wheels that respectively model and represent the movement operation parts 3L and 3R which move in the Y-axis direction. Further, the height h_y of the reference part Ps_y and the mass point Ga_y from the swing fulcrum of the rod 62_y is set to a preset default value (constant value).

In this inverted pendulum model, the movement of the mass point Gay corresponds to the movement of the overall center of gravity of the mobile body 1 viewed from the X-axis direction, and the tilt angle θb_y of the rod 62_y with respect to the vertical direction matches the tilt angle of the seat part 4 (or the pedestal 12) in the roll direction. Further, the Y-axis direction translational movement of the movement operation parts 3L and 3R corresponds to the Y-axis direction translational movement of the wheels 61R_y and 61L_y due to rolling.

Here, with reference to FIG. 4A, to describe in more detail the positional relationship between the reference part Ps_x and the mass point Ga_x when viewed from the Y-axis direction, the position of the reference part Ps_x corresponds to the position of the overall center of gravity of the mobile body 1 in the case where it is assumed that the occupant riding on the seat part 4 (the occupant seated on the seat 4a) remains still in a predetermined neutral posture with respect to the seat part 4. Therefore, in this case, the position of the mass point Ga_x matches the position of the reference part Ps_x. This also applies to the positional relationship between the reference part Ps_y and the mass point Ga_y when viewed from the X-axis direction.

However, in reality, when the occupant riding on the seat part 4 moves his or her upper body or the like with respect to the seat part 4, the actual X-axis direction position and Y-axis direction position of the overall center of gravity generally deviates in the horizontal direction from the positions of the reference parts Ps_x and Ps_y, respectively. Therefore, in FIGS. 4A and 4B, the positions of the mass points Ga_x and Ga_y are shown in a state of being deviated from the positions of the reference parts Ps_x and Ps_y, respectively.

The behavior of the overall center of gravity of the mobile body 1 represented by the inverted pendulum models as described above is expressed by the following equations (1a), (1b), (2a), and (2b). In this case, the equations (1a) and (1b) represent the behavior viewed in the Y-axis direction, and the equations (2a) and (2b) represent the behavior viewed in the X-axis direction.

$$Vb\_x = Vw\_x + h\_x \cdot \omega b\_x \tag{1a}$$

$$dVb\_x/dt = (g/h\_x) \cdot (\theta b\_x \cdot (h\_x - r\_x) + \text{Ofst}\_x) + \omega z \cdot Vb\_y \tag{1b}$$

$$Vb\_y = Vw\_y + h\_y \cdot \omega b\_y \tag{2a}$$

$$dVb\_y/dt = (g/h\_y) \cdot (\theta b\_y \cdot h\_y + \mathrm{Ofst}\_y) - \omega z \cdot Vb\_x \tag{2b}$$

Here, Vb_x is the X-axis direction translational speed of the overall center of gravity of the mobile body 1; θb_x is the tilt angle of the seat part 4 in the direction around the Y-axis (the pitch direction); Vw_x is the X-axis direction translational speed of the wheel 61_x; ωb_x is the angular velocity representing the temporal change rate of θb_x (=dθb_x/dt); Ofst_x is the X-axis direction offset amount of the X-axis direction position of the overall center of gravity of the mobile body 1 (the X-axis direction position of the mass point Ga_x) from the position of the reference part Ps_x; Vb_y is the Y-axis direction translational speed of the overall center of gravity of the mobile body 1; Vw_y is the Y-axis direction translational speed of the wheels 61L_y and 61R_y; θb_y is the tilt angle of the seat part 4 in the direction around the X-axis (the roll direction); ωb_y is the angular velocity representing the temporal change rate of θb_y (=dθb_y/dt); and Ofst_y is the Y-axis direction offset amount of the Y-axis direction position of the overall center of gravity of the mobile body 1 (the Y-axis direction position of the mass point Ga_y) from the position of the reference part Ps_y. Further, ωz is the turning speed (the angular velocity in the yaw direction) of the mobile body 1, and g is the gravitational acceleration constant.

Further, in the equations (1a), (1b), (2a), and (2b), the positive direction of θb_x and ωb_x is the direction in which the overall center of gravity of the mobile body 1 is tilted in the positive direction of the X-axis (forward), and the positive direction of θb_y and ωb_y is the direction in which the overall center of gravity of the mobile body 1 is tilted in the positive direction of the Y-axis (leftward). Further, the positive direction of ωz is the counterclockwise direction when the mobile body 1 is viewed from above.

In the embodiment, the algorithm of the process of the movement control part 31 is constructed based on the inverted pendulum models that consider the offset amounts of the overall center of gravity of the mobile body 1 from the reference parts Ps_x and Ps_y (hereinafter referred to as the center of gravity offset amount) and the centrifugal force as described above. The process of the movement control part 31 will be specifically described below. Further, in the following description, regarding reference numerals of state quantities such as the speed and the acceleration, a reference numeral to which the subscript "_xy" is added means a set of an X-axis direction component and a Y-axis direction component.

The movement control part 31 sequentially executes the process of the target translational speed determination part 40, the process of the target turning speed determination part 50, and the process of the individual target translational speed determination part 60 in a predetermined calculation process cycle, and performs the movement control of the movement operation parts 3L and 3R.

Figure 5:
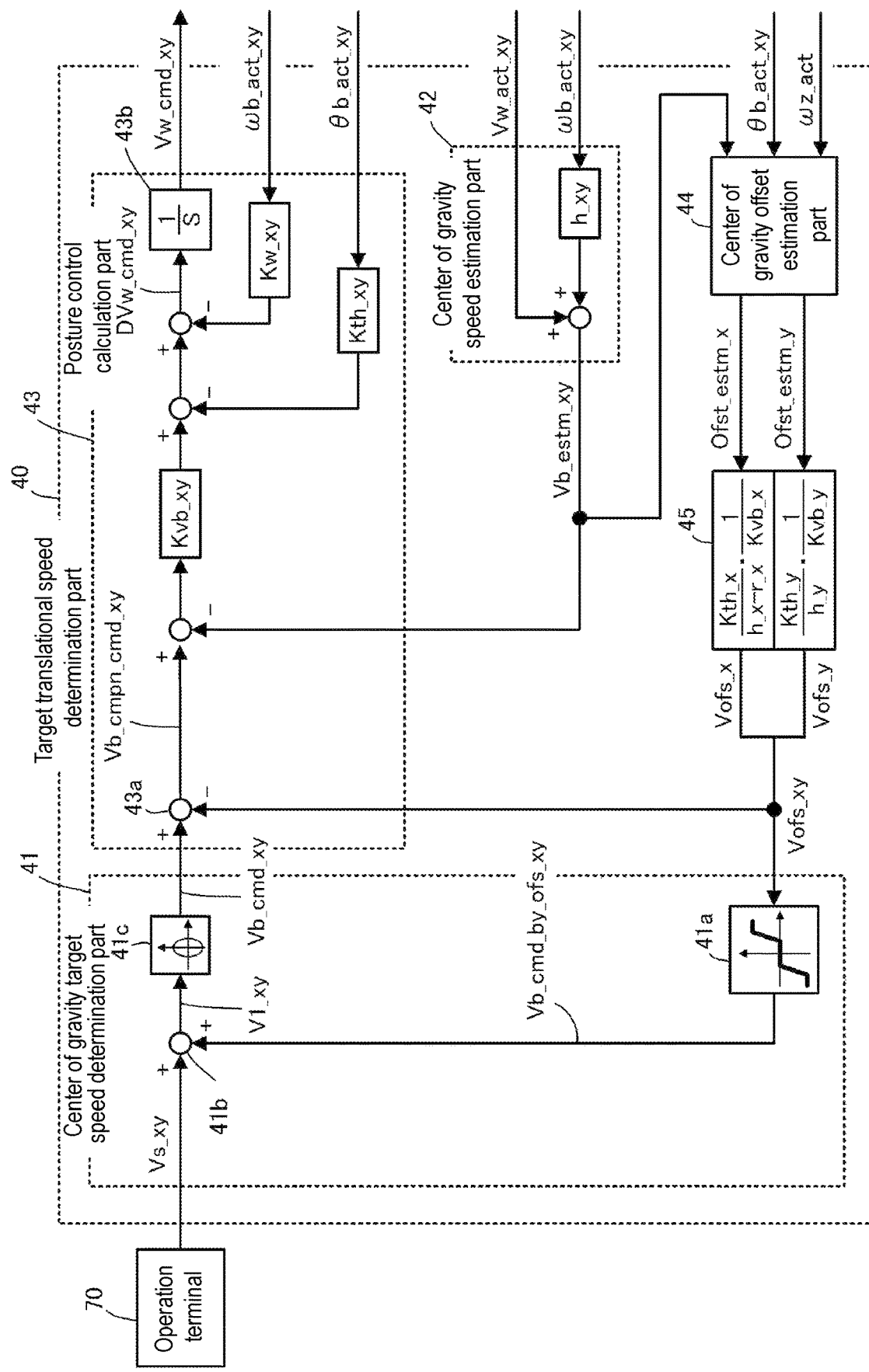
FIG. 5 is a block diagram showing a process of a target translational speed determination part shown in FIG. 3.

As shown in FIG. 5, the target translational speed determination part 40 includes a center of gravity target speed determination part 41 for determining the center of gravity target speed, which is a target value of the translational speed of the overall center of gravity of the mobile body 1; a center of gravity speed estimation part 42 for estimating the center of gravity speed, which is the actual translational speed of the overall center of gravity of the mobile body 1; a posture control calculation part 43 for determining the overall target translational speed of the movement operation parts 3L and 3R to stabilize the posture of the seat part 4 (to balance the overall center of gravity) while making the actual center of gravity speed follow the center of gravity target speed; a center of gravity offset estimation part 44 for estimating the center of gravity offset amount (which will be described later) of the overall center of gravity of the mobile body 1; and a center of gravity offset influence amount calculation part 45 for calculating the center of gravity offset influence amount (which will be described later) due to the center of gravity offset amount.

Then, the target translational speed determination part 40 first executes the process of the center of gravity speed estimation part 42 in each calculation process cycle. The center of gravity speed estimation part 42 calculates the estimation value Vb_estm_xy of the actual center of gravity speed of the mobile body 1 based on the kinematic relational expressions represented by the equations (1a) and (2a). Specifically, as shown in FIG. 5, the estimation value Vb_estm_xy of the center of gravity speed is calculated by the following equations (3a) and (3b) based on the value of the actual translational speed Vw_act_xy of the movement operation parts 3L and 3R, the actual temporal change rate (the tilt angular velocity) ωb_act_xy of the tilt angle θb_xy of the seat part 4, and the height h_xy (default set value) of the overall center of gravity.

$$Vb\_\mathrm{estm}\_x = Vw\_\mathrm{act}\_x + h\_x \cdot \omega b\_\mathrm{act}\_x \tag{3a}$$

$$Vb\_\mathrm{estm}\_y = Vw\_\mathrm{act}\_y + h\_y \cdot \omega b\_\mathrm{act}\_y \tag{3b}$$

In this case, in the embodiment, the overall target translational speed Vw_cmd_xy (the previous value) of the movement operation parts 3L and 3R determined by the posture control calculation part 43 in the previous calculation process cycle is used as the value of Vw_act_x and Vw_act_y in the above calculation. However, for example, the rotation speed of each output shaft of the electric motors 21aL, 21bL, 21aR, and 21bR may be detected, and the latest values of Vw_act_x and Vw_act_y estimated from those detection values may be used in the calculations of the equations (3a) and (3b).

Further, in the embodiment, the latest values of the temporal change rates of the measurement values of the tilt angles θb_x and θb_y of the seat part 4 measured by the tilt sensor 23 or the latest values of the measurement values of ωb_act_x and ωb_act_y are used as the values of ωb_act_x and ωb_act_y.

Next, the target translational speed determination part 40 determines the center of gravity offset amount estimation value Ofst_estm_xy, which is an estimation value of the center of gravity offset amount Ofst_xy, by executing the process of the center of gravity offset estimation part 44. Further, in the following description related to the center of gravity offset estimation part 44, the center of gravity speed estimation values Vb_estm_x and Vb_estm_y calculated by the center of gravity speed estimation part 42 are referred to as first center of gravity speed estimation values Vb_estm_x and Vb_estm_y, respectively.

Figure 6:
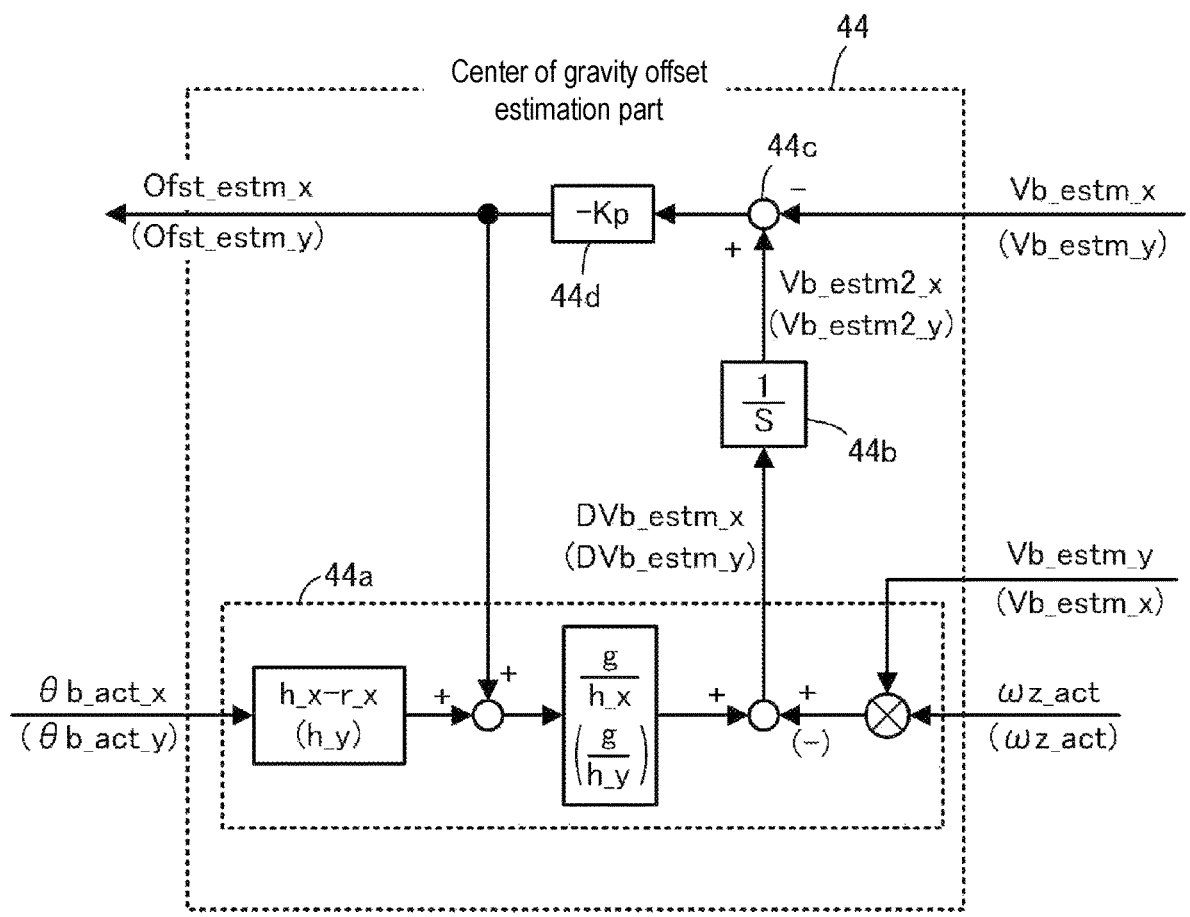
FIG. 6 is a block diagram showing a process of the center of gravity offset estimation part shown in FIG. 5.

The process of the center of gravity offset estimation part 44 is executed, for example, as shown in the block diagram of FIG. 6. Further, in FIG. 6, among the center of gravity offset amount estimation value Ofst_estm_xy, the reference numeral of the state quantity related to the determination process of the X-axis direction center of gravity offset amount estimation value Ofst_estm_x is shown without parentheses, and the reference numeral of the state quantity related to the determination process of the Y-axis direction center of gravity offset amount estimation value Ofst_estm_y is shown in parentheses. Further, for the arithmetic symbols ("+" and "−"), the arithmetic symbols common to both the determination process of the X-axis direction center of gravity offset amount estimation value Ofst_estm_x and the determination process of the Y-axis direction center of gravity offset amount estimation value Ofst_estm_y are shown by symbols without parentheses, and arithmetic symbols related only to the determination process of the Y-axis direction center of gravity offset amount estimation value Ofst_estm_y are shown by symbols with parentheses.

To specifically describe the process of FIG. 6, the center of gravity offset estimation part 44 uses a measurement value (the latest value) of the tilt angle θb_act_xy measured by the tilt sensor 23, a measurement value (the latest value) of the yaw rate ωz_act measured by the yaw rate sensor 24, the first center of gravity speed estimation value Vb_estm_xy (the latest value) calculated by the center of gravity speed estimation part 42, and the center of gravity offset amount estimation value Ofst_estm_xy (the previous value) determined in the previous calculation process cycle to execute the calculation process on the right side of the equations (1b) and (2b) by a calculation part 44a, thereby calculating the estimation value DVb_estm_xy of the translational acceleration of the overall center of gravity of the mobile body 1.

Further, the center of gravity offset estimation part 44 executes a process of integrating each component (the X-axis direction component and the Y-axis direction component) of the translational acceleration estimation value DVb_estm_xy by a calculation part 44b, and thereby calculates a second center of gravity speed estimation value Vb_estm2_xy, which is a second estimation value of the overall center of gravity speed of the mobile body 1.

Next, the center of gravity offset estimation part 44 executes a process of calculating the difference of each component between the second center of gravity speed estimation value Vb_estm2_xy (the latest value) and the first center of gravity speed estimation value Vb_estm_xy (the latest value) by a calculation part 44c. Further, the center of gravity offset estimation part 44 executes a process of multiplying each component of the difference by a gain (−Kp) having a predetermined value by a calculation part 44d, and thereby determines the latest value of the center of gravity offset amount estimation value Ofst_estm_xy.

Next, the target translational speed determination part 40 executes the process of the center of gravity offset influence amount calculation part 45 shown in FIG. 5, and thereby calculates the center of gravity offset influence amount Vofs_xy. The center of gravity offset influence amount Vofs_xy represents the offset of the actual speed with respect to the target speed of the overall center of gravity when feedback control is performed without considering that the position of the overall center of gravity of the mobile body 1 deviates from the position of the reference part Ps_xy in the inverted pendulum model in the posture control calculation part 43 (to be described later).

The center of gravity offset influence amount calculation part 45 multiplies the newly determined X-axis direction center of gravity offset amount estimation value Ofst_estm_x by a value (Kth_x/(h_x−r_x))/Kvb_x, and thereby calculates the X-axis direction center of gravity offset influence amount Vofs_xy. Further, the center of gravity offset influence amount calculation part 45 multiplies the newly determined Y-axis direction center of gravity offset amount estimation value Ofst_estm_y by a value (Kth_y/h_y)/Kvb_y, and thereby calculates the Y-axis direction center of gravity offset influence amount Vofs_y. In addition, Kth_x, Kth_y, Kvb_x, and Kvb_y are gains of predetermined values used in the process of the posture control calculation part 43, which will be described later.

Next, the target translational speed determination part 40 executes the process of the center of gravity target speed determination part 41 shown in FIG. 5, and thereby determines the center of gravity target speed Vb_cmd_xy for each calculation process cycle. In this case, the center of gravity target speed determination part 41 first determines a basic value V1_xy of the center of gravity target speed Vb_cmd_xy, based on the speed command Vs_xy (the latest value) given by the operation terminal 70 according to the operation of the operation terminal 70 and based on the center of gravity offset influence amount Vofs_xy (the latest value) determined by the center of gravity offset influence amount calculation part 45. The basic value V1_xy corresponds to a request value of the center of gravity speed according to the operation of the operation terminal 70 and the center of gravity offset amount estimation value Ofst_estm_xy due to the movement of the upper body of the occupant. Hereinafter, the above basic value V1_xy will be referred to as a center of gravity speed basic request value V1_xy.

Specifically, the center of gravity target speed determination part 41 executes a dead zone process and a limit process for the center of gravity offset influence amount Vofs_xy by a process part 41a, and thereby determines a center of gravity speed addition amount Vb_cmd_by_ofs_xy as a component corresponding to the center of gravity offset amount estimation value Ofst_estm_xy in the center of gravity speed basic request value V1_xy.

In this case, the center of gravity target speed determination part 41 sets the X-axis direction center of gravity speed addition amount Vb_cmd_by_ofs_x to zero when the magnitude of the X-axis direction center of gravity offset influence amount Vofs_x is within the dead zone (a value relatively close to zero), which is a predetermined range near zero.

Further, when the magnitude of the X-axis direction center of gravity offset influence amount Vofs_x is a value deviating from the dead zone, the center of gravity target speed determination part 41 determines that the X-axis direction center of gravity speed addition amount Vb_cmd_by_ofs_x has the same polarity as Vofs_x, and that its magnitude (the absolute value) increases as the magnitude of the deviation amount of Vofs_x from the dead zone increases. However, the value of the center of gravity speed addition amount Vb_cmd_by_ofs_x is limited to a range between a predetermined upper limit value (>0) and a predetermined lower limit value (≤0). The determination process of the Y-axis direction center of gravity speed addition amount Vb_cmd_by_ofs_y is the same as that described above.

Next, the center of gravity target speed determination part 41 executes a process of adding each component of the center of gravity speed addition amount Vb_cmd_by_ofs_xy to each component of the speed command Vs_xy given from the operation terminal 70 by a process part 41b, and thereby calculates the center of gravity speed basic request value V1_xy. That is, the center of gravity speed basic request value V1_xy (a set of V1_x and V1_y) is determined by the calculation process of V1_x=Vs_x+Vb_cmd_by_ofs_x and V1_y=Vs_y+Vb_cmd_by_ofs_y.

The center of gravity target speed determination part 41 further executes a process of a process part 41c. In the process part 41c, in order to prevent the rotation speed of each output shaft of the electric motors 21a and 21b for driving each of the movement operation parts 3 from deviating from a predetermined allowable range, a limit process is executed to determine the center of gravity target speed Vb_cmd_xy (a set of Vb_cmd_x and Vb_cmd_y) which limits the combination of the center of gravity speed basic request values V1_x and V1_y.

In this case, when the set of the center of gravity speed basic request values V1_x and V1_y obtained by the process part 41b is within a predetermined region in a coordinate system with the value of V1_x as the vertical axis and the value of V1_y as the horizontal axis, the set of the center of gravity speed basic request values V1_x and V1_y is determined as the center of gravity target speed Vb_cmd_xy as it is.

Further, when the set of the center of gravity speed basic request values V1_x and V1_y obtained by the process part 41b deviates from the predetermined region in the coordinate system, the set is limited to a set on the boundary of the predetermined region and is determined as the center of gravity target speed Vb_cmd_xy.

In the embodiment, as described above, the center of gravity target speed Vb_cmd_xy is determined according to the speed command Vs_xy according to the operation of the operation terminal 70 and the center of gravity offset influence amount Vofs_xy (or the center of gravity offset amount Ofst_xy). Therefore, each of the operation of the operation terminal 70 and the change in the center of gravity offset amount Ofst_xy due to the movement (weight movement) of the upper body of the occupant and the like functions as the maneuver operation related to the movement of the mobile body 1.

In addition, the speed command Vs_xy by the operation of the operation terminal 70 may be omitted, and the target center of gravity speed addition amount Vb_cmd_by_ofs_xy may be determined as it is as the center of gravity speed basic request value V1_xy. Alternatively, the speed command Vs_xy by the operation of the operation terminal 70 may be determined as it is as the center of gravity speed basic request value V1_xy.

After executing the process of the center of gravity target speed determination part 41 as described above, the target translational speed determination part 40 then executes the process of the posture control calculation part 43. The posture control calculation part 43 determines the overall target translational speed Vw_cmd_xy of the movement operation parts 3L and 3R to stabilize the posture of the seat part 4 (to balance the overall center of gravity of the mobile body 1) by the process shown in the block diagram of FIG. 5.

More specifically, the posture control calculation part 43 first executes, by a calculation part 43a, a process of subtracting each component of the center of gravity offset influence amount Vofs_xy from each component of the center of gravity target speed Vb_cmd_xy, and thereby determines the target speed Vb_cmpn_cmd_xy after compensation for the center of gravity offset.

Next, the posture control calculation part 43 calculates each of the X-axis direction target translational acceleration DVw_cmd_x and the Y-axis direction target translational acceleration DVw_cmd_y in the target translational acceleration DVw_cmd_xy, which is a target value of the overall translational acceleration of the movement operation parts 3L and 3R, by the processes of calculation parts excluding the calculation part 43a and a calculation part 43b which performs the integration calculation.

$$DVw\_cmd\_x = Kvb\_x \cdot (Vb\_cmpn\_cmd\_x - Vb\_estm\_x) - Kth\_x \cdot \theta b\_act\_x - Kw\_x \cdot \omega b\_act\_x \quad (4a)$$

$$DVw\_cmd\_y = Kvb\_y \cdot (Vb\_cmpn\_cmd\_y - Vb\_estm\_y) - Kth\_y \cdot \theta b\_act\_y - Kw\_y \cdot \omega b\_act\_y \quad (4b)$$

Kvb_xy, Kth_xy, and Kw_xy in the equations (4a) and (4b) are gains of predetermined values set in advance. Further, on the right side of the equation (4a), the first term is a feedback operation amount component according to the difference between the X-axis direction target speed Vb_cmpn_cmd_x (the latest value) after compensation for the center of gravity offset of the overall center of gravity of the mobile body 1 and the X-axis direction center of gravity speed estimation value Vb_estm_x (the latest value) calculated by the center of gravity speed estimation part 42; the second term is a feedback operation amount component according to the measurement value (the latest value) of the actual tilt angle θb_act_x of the seat part 4 in the pitch direction (the direction around the Y-axis); and the third term is a feedback operation amount component according to the measurement value (the latest value) of the actual tilt angular velocity ωb_act_x of the seat part 4 in the pitch direction. Then, the X-axis direction target translational acceleration DVw1_cmd_x is calculated as a combined operation amount of these feedback operation amount components.

Similarly, on the right side of the equation (4b), the first term is a feedback operation amount component according to the difference between the Y-axis direction target speed Vb_cmpn_cmd_y (the latest value) after compensation for the center of gravity offset of the overall center of gravity of the mobile body 1 and the Y-axis direction center of gravity speed estimation value Vb_estm_y (the latest value) calculated by the center of gravity speed estimation part 42; the second term is a feedback operation amount component according to the measurement value (the latest value) of the actual tilt angle θb_act_y of the seat part 4 in the roll direction (the direction around the X-axis); and the third term is a feedback operation amount component according to the measurement value (the latest value) of the actual tilt angular velocity ωb_act_y of the seat part 4 in the roll direction. Then, the Y-axis direction target translational acceleration DVw1_cmd_y is calculated as a combined operation amount of these feedback operation amount components.

Further, the equations (4a) and (4b) may be rewritten into the following equations (4a)' and (4b)', respectively.

$$DVw\_cmd\_x = Kvb\_x \cdot (Vb\_cmd\_x - Vb\_estm\_x) - Kth\_x \cdot (Ofst\_estm\_x/(h\_x - r\_x) + \theta b\_act\_x) - Kw\_x \cdot \omega b\_act\_x \quad (4a)'$$

$$DVw\_cmd\_y = Kvb\_y \cdot (Vb\_cmd\_y - Vb\_estm\_y) - Kth\_y \cdot (Ofst\_estm\_y/h\_y + \theta b\_act\_y) - Kw\_y \cdot \omega b\_act\_y \quad (4b)'$$

In this case, when the mobile body 1 is viewed from the Y-axis direction, the second term on the right side of the equation (4a)' has a meaning as a feedback operation amount component for making the actual position of the overall center of gravity of the mobile body 1 in the X-axis direction be a position directly above the floor-contacting part of the movement operation parts 3L and 3R.

Further, when the mobile body 1 is viewed from the X-axis direction, the second term on the right side of the equation (4b)' has a meaning as a feedback operation amount component for making the actual position of the overall center of gravity of the mobile body 1 in the Y-axis direction be a position directly above the swing fulcrum of the seat part 4 (the axial support part of the pedestal 12 with respect to the main body part 11 of the base 2).

Next, the posture control calculation part 43 determines the overall target translational speed Vw_cmd_xy (the latest value) of the movement operation parts 3L and 3R by integrating each component of the target translational acceleration DVw_cmd_xy by the calculation part 43b.

The process of the target translational speed determination part 40 is executed as described above in each calculation process cycle. By this process, the overall target translational speed Vw_cmd_xy of the movement operation parts 3L and 3R is sequentially determined so that the actual center of gravity speed of the mobile body 1 can be made to follow the target center of gravity speed Vb_cmd_xy while maintaining the stable posture of the seat part 4 of the mobile body 1.

Figure 7:
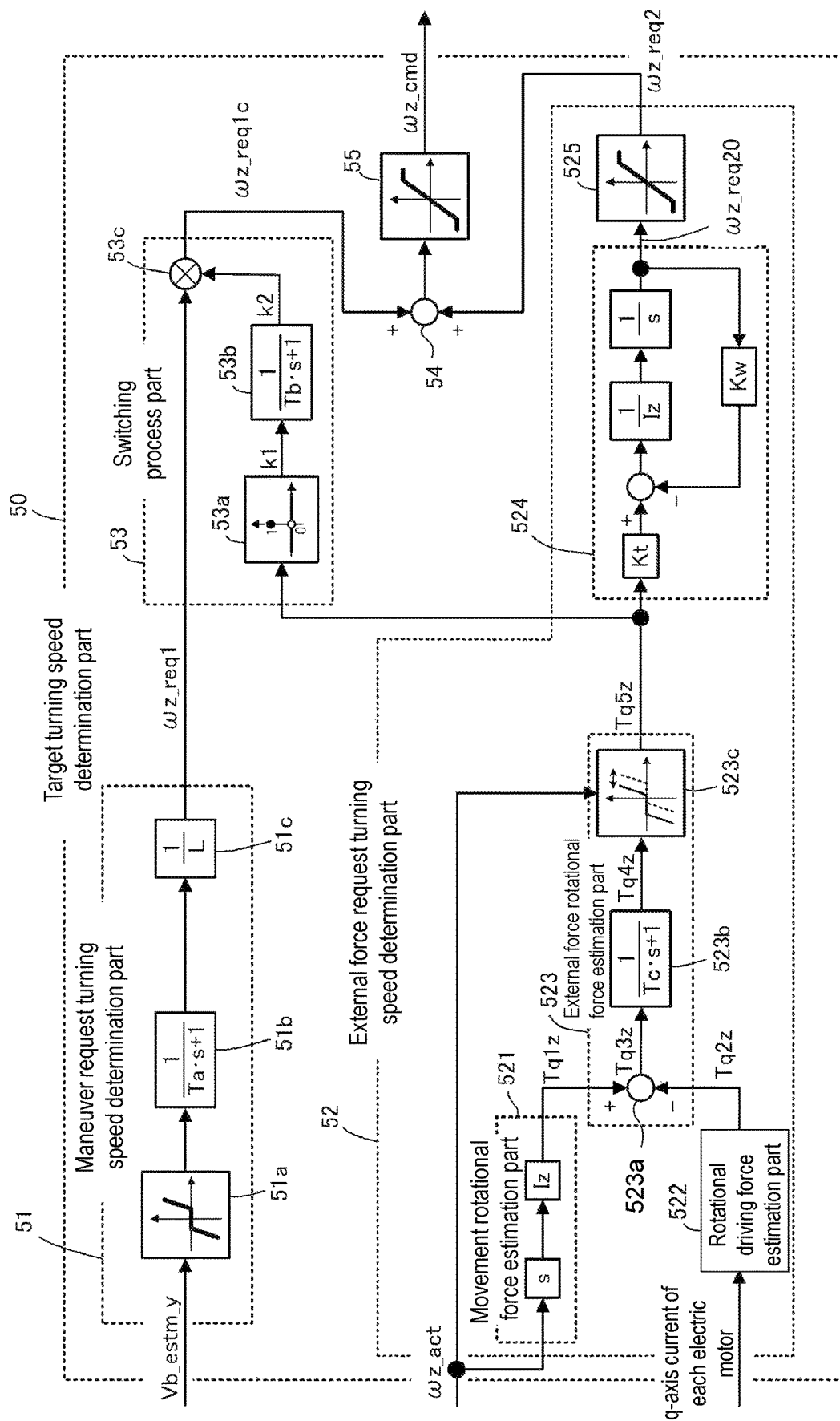
FIG. 7 is a block diagram showing a process of a target turning speed determination part shown in FIG. 3.
Figure 8:
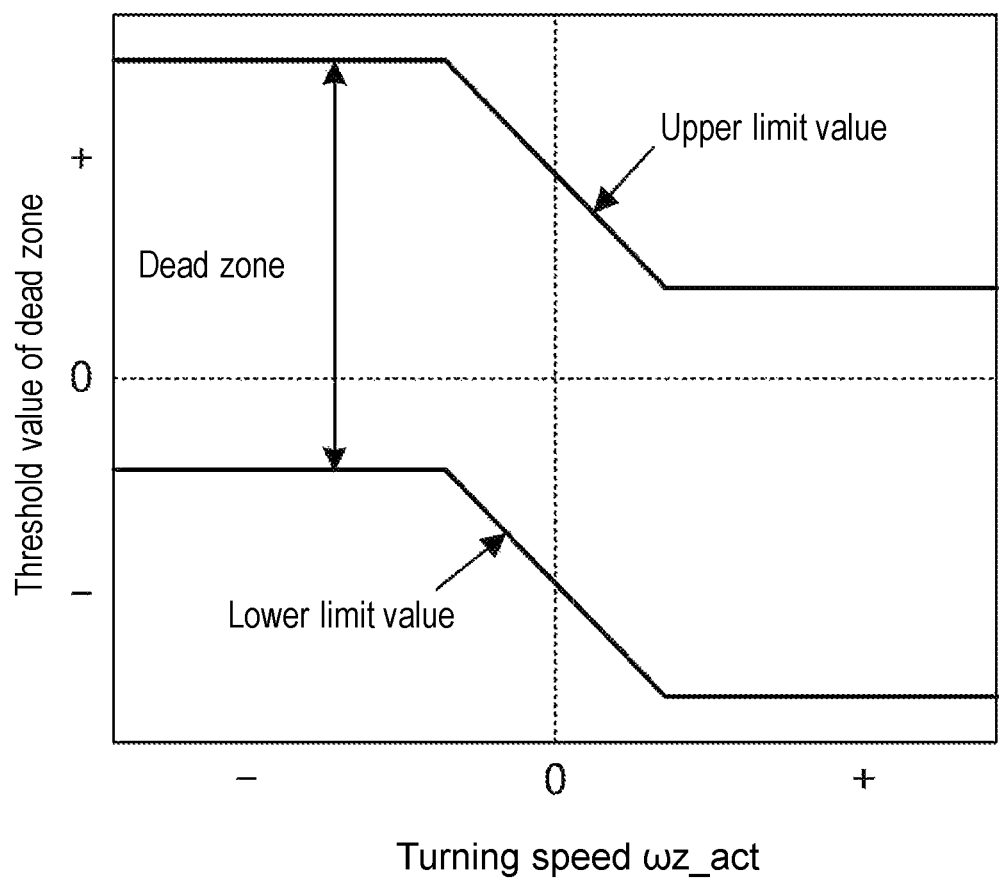
FIG. 8 is a graph showing a setting example of a dead zone used in a process of an external force rotational force estimation part shown in FIG. 7.

Next, the process of the target turning speed determination part 50 will be described with reference to FIGS. 7 and 8. The target turning speed determination part 50 executes the process shown in the block diagram of FIG. 7 at a predetermined calculation process cycle. Specifically, in each calculation process cycle, the target turning speed determination part 50 first executes a process of a maneuver request turning speed determination part 51 for determining a maneuver request turning speed ωz_req1, which is a request value of the turning speed of the mobile body 1 based on the maneuver operation of the occupant of the mobile body 1, and executes a process of an external force request turning speed determination part 52 for determining the external force request turning speed, which is a request value of the turning speed of the mobile body 1 based on an external force acting on the mobile body 1 including the occupant (specifically, an external force that tries to turn the mobile body 1).

Regarding the process of the maneuver request turning speed determination part 51, in the embodiment, the action of the occupant moving the upper body or the like so as to move the overall center of gravity of the mobile body 1 in the Y-axis direction is a maneuver operation for performing the turning action of the mobile body 1.

For example, when trying to turn the mobile body 1 to the right side (the clockwise direction when viewed from above), the occupant performs a weight transfer operation such as tilting the upper body to the right side, and thereby moves the overall center of gravity of the mobile body 1 to the right side. Further, when trying to turn the mobile body 1 to the left side (the counterclockwise direction when viewed from above), the occupant performs a weight transfer operation such as tilting the upper body to the left side, and thereby moves the overall center of gravity of the mobile body 1 to the left side.

Therefore, in the embodiment, in the process of the maneuver request turning speed determination part 51, the Y-axis direction center of gravity speed estimation value Vb_estm_y calculated by the center of gravity speed estimation part 42 is regarded as an index value representing a maneuver operation for turning the mobile body 1. Then, the maneuver request turning speed ωz_req1 is determined according to the Y-axis direction center of gravity speed estimation value Vb_estm_y (the latest value) of the maneuver request turning speed determination part 51.

Specifically, the maneuver request turning speed determination part 51 executes a dead zone process on the input Y-axis direction center of gravity speed estimation value Vb_estm_y by a process part 51a. In the dead zone process, the process part 51a sets the output value of the process part 51a to zero when the Y-axis direction center of gravity speed estimation value Vb_estm_y is a value within a predetermined dead zone near zero.

Further, when the Y-axis direction center of gravity speed estimation value Vb_estm_y is a value deviating from the dead zone, the process part 51a determines that the output value of the process part 51a has the same polarity as Vb_estm_y, and that its magnitude (the absolute value) increases as the magnitude of the deviation amount of Vb_estm_y from the dead zone increases. For example, when Vb_estm_y is greater than the upper limit value (>0) of the dead zone, the output value of the process part 51a is determined to be a value proportional to (Vb_estm_y—the upper limit value of the dead zone), and when Vb_estm_y is less than the lower limit value (<0) of the dead zone, the output value of the process part 51a is determined to be a value proportional to (Vb_estm_y—the lower limit value of the dead zone).

The maneuver request turning speed determination part 51 further executes a low-pass characteristic filtering process on the output value of the process part 51a by a process part 51b. Further, for example, a low-pass filter represented by a transfer function of $1/(Ta \cdot s+1)$, where Ta is a time constant, may be used as the process part 51b.

The maneuver request turning speed determination part 51 further executes a process of dividing the output value of the process part 51b by a preset turning radius L having a predetermined value by a process part 51c, and thereby determines the maneuver request turning speed ωz_req1. In this way, the maneuver request turning speed ωz_req1 based on the maneuver operation of the occupant is determined.

In addition, the turning speed may be set by an operation of the operation terminal 70. In this case, the turning speed set by the operation terminal 70 may be set as the maneuver request turning speed ωz_req1. Alternatively, for example, the turning speed obtained by combining the turning speed set by the operation terminal 70 and the turning speed set according to the Y-axis direction center of gravity speed estimation value Vb_estm_y may be set as the maneuver request turning speed ωz_req1.

In the process of the external force request turning speed determination part 52, the external force request turning speed determination part 52 first executes a process of a movement rotational force estimation part 521 for estimating a movement rotational force Tq1z, which is a rotational force balanced with the inertial force (the inertial rotational force) in the yaw direction generated by the movement of the mobile body 1 (that is, the rotational force in which the sum with the inertial rotational force becomes zero); and a process of a rotational driving force estimation part 522 for estimating the rotational driving force in the yaw direction applied to the movement operation parts 3 from the electric motors 21a and 21b.

The movement rotational force estimation part 521 calculates an estimation value of the movement rotational force Tq1z based on the measurement value of the yaw rate ωz_act of the mobile body 1 by the yaw rate sensor 24 by the following equation (5).

$$Tq1z = (d\omega z\_act/dt) \cdot Iz \quad (5)$$

Here, Iz is a set value of the inertial moment (inertia) of the mobile body 1 in the yaw direction. In addition, for example, in each calculation process cycle of the target turning speed determination part 50, the differential value dωz_act/dt of the target turning speed ωz_cmd may be sequentially calculated, and the value of dωz_act/dt obtained in the previous calculation process cycle may be used instead of dωz_act/dt to calculate an estimation value of the rotational force Tq1z.

Regarding the process of the rotational driving force estimation part 522, in the mobile body 1 of the embodiment, the rotational driving force (the torque around the axes of the core bodies 6 of the movement operation parts 3) transmitted from the electric motors 21a and 21b to the movement operation parts 3 for driving the movement operation parts 3 to roll each of the movement operation parts 3 in the X-axis direction is substantially proportional to the total output torques of the electric motors 21a and 21b. Further, the output torques of the electric motors 21a and 21b are proportional to the q-axis current of the energizing currents of the electric motors 21a and 21b, respectively.

Further, the X-axis direction translational driving force applied to the movement operation parts 3 by the rotational driving force (the torque around the axes of the core bodies 6) transmitted from the electric motors 21a and 21b to the movement operation parts 3 is a value obtained by dividing the rotational driving force by the turning radius $r\_x$ of the movement operation parts 3 around the axes of the core bodies 6 (=the radius of the wheel 61_$x$ shown in FIG. 4A).

Therefore, the relationship of the following equation (6a) is established between the X-axis direction translational driving force Fd_L_x of the left movement operation part 3L and the q-axis currents iq_a_L and iq_b_L of each of the electric motors 21aL and 21bL of the movement operation part 3L. Similarly, the relationship of the following equation (6b) is established between the X-axis direction translational driving force Fd_R_x of the right movement operation part 3R and the q-axis currents iq_a_R and iq_b_R of each of the electric motors 21aR and 21bR of the movement operation part 3R.

$$Fd\_L\_x = (iq\_a\_L \cdot Km + iq\_b\_L \cdot Km) \cdot Kc/r\_x \quad (6a)$$

$$Fd\_R\_x = (iq\_a\_R \cdot Km + iq\_b\_R \cdot Km) \cdot Kc/r\_x \quad (6b)$$

In the equations (6a) and (6b), Km is a coefficient having a predetermined value that defines the relationship between the q-axis current and the output torque of each electric motor 21, and Kc is a coefficient having a predetermined value that defines the relationship between the rotational driving force of each movement operation part 3 (the rotational driving force around the axis of the core body 6) and the output torque of each electric motor 21 for driving the movement operation part 3. In addition, the coefficient Km may be different in each electric motor 21. Further, the coefficient Km may be different in each movement operation part 3.

Further, the relationship of the following equation (7) is established between the X-axis direction translational driving forces Fd_L_x and Fd_R_x applied to the left and right movement operation parts 3L and 3R and the rotational driving force Tq2z of the mobile body 1 in the yaw direction.

$$Tq2z = Fd\_R\_x \cdot (Tread/2) - Fd\_L\_x \cdot (Tread/2) \quad (7)$$

In the equation (7), Tread is the interval (tread) between the movement operation parts 3L and 3R in the Y-axis direction.

Therefore, the rotational driving force estimation part 522 estimates the rotational driving force Tq2z of the mobile body 1 in the yaw direction based on the estimation values of the q-axis currents iq_a_L, iq_b_L, iq_a_R, and iq_b_R of the electric motors 21aL, 21bL, 21aR, and 21bR according to the above equations (6a), (6b), and (7).

Next, the external force request turning speed determination part 52 executes, by an external force rotational force estimation part 523, a process of estimating the external force rotational force Tq5z, which is the rotational force in the yaw direction due to an external force applied to the mobile body 1. Here, specifically, the above-mentioned "external force" is a force that acts on the mobile body 1 from the outside so as to turn the mobile body 1 other than the floor reaction force acting on the movement operation parts 3 from the floor surface due to the driving of each of the movement operation parts 3 by the electric motors 21a and 21b.

For example, a contact reaction force received from an external object when the occupant tries to turn the mobile body 1 by contacting the external object (a handrail, a wall, the floor surface and the like) or a force applied to the mobile body 1 when the attendant of the occupant tries to turn the mobile body 1 or the like corresponds to the above-mentioned "external force."

Further, the movement rotational force Tq1z estimated by the movement rotational force estimation part 521 as described above includes the rotational driving force Tq2z estimated by the rotational driving force estimation part 522 and the external force rotational force Tq5z caused by the external force.

Therefore, in order to estimate the external force rotational force Tq5z, the external force rotational force estimation part 523 executes, by a calculation part 523a, a process of subtracting the estimation value of the rotational driving force Tq2z obtained by the rotational driving force estimation part 522 from the estimation value of the movement rotational force Tq1z obtained by the movement rotational force estimation part 521.

The output value Tq3z (=Tq1z−Tq2z) of the calculation part 523a is approximately close to the external force rotational force Tq5z, but tends to include high-frequency noise components and the like. Therefore, the external force rotational force estimation part 523 further executes a low-pass characteristic filtering process on the output value Tq3z of the calculation part 523a by a process part 523b. Further, for example, as shown in the drawing, a low-pass filter represented by a transfer function of 1/(Tc·s+1), where Tc is a time constant, may be used as the process part 523b.

Further, during the turning operation of the mobile body 1, the frictional force (dynamic frictional force) according to the yaw rate of the mobile body 1 acts on the mobile body 1 from the floor surface via the movement operation parts 3L and 3R as a braking force of the turning operation of the mobile body 1 regardless of the presence or absence of the external force. Therefore, the output value Tq3z of the calculation part 523a also includes the rotational braking force in the yaw direction corresponding to the frictional force. Further, the direction and magnitude of the rotational braking force change according to the direction (polarity) and magnitude of the yaw rate of the mobile body 1.

Therefore, the external force rotational force estimation part 523 executes a dead zone process on the output value Tq4z of the process part 523b by a process part 523c. In the dead zone process, as illustrated in the graph of FIG. 8, the process part 523c determines the upper limit value and the lower limit value of the dead zone so as to change the dead zone according to the measurement value of the yaw rate ωz_act of the mobile body 1 obtained by the yaw rate sensor 24.

In this case, as the yaw rate ωz_act increases from the negative polarity value to the positive polarity value, the upper limit value (>0) and the lower limit value (<0) decrease, and the upper limit value and the lower limit value of the dead zone are set according to the measurement value of the yaw rate ωz_act so that the central value (=(the upper limit value+the lower limit value)/2) of the dead zone changes from the positive polarity value to the negative polarity value. And the width of the dead zone (=the upper limit value−the lower limit value) is maintained constant. In addition, the dead zone may be set according to the target turning speed ωz_cmd determined in the previous calculation process cycle instead of the measurement value of the yaw rate ωz_act.

Then, the process part 523c executes the dead zone process on the output value Tq4z of the process part 523b by using the dead zone set as described above. In the dead zone process, the process part 523c sets the output value Tq5z of the process part 523c to zero when the output value Tq4z of the process part 523b is a value within the set dead zone.

Further, when the output value Tq4z of the process part 523b is a value deviating from the set dead zone, the process part 523c determines that the output value Tq5z of the process part 523c has the same polarity as Tq4z, and that its magnitude (the absolute value) increases as the magnitude (the absolute value) of the deviation amount of Tq4z from the dead zone increases.

For example, when Tq4z is greater than the upper limit value of the dead zone, the output value Tq5z of the process part 523c is determined to be a value proportional to (Tq4z—the upper limit value of the dead zone), and when Tq4z is less than the lower limit value of the dead zone, the output value Tq5z of the process part 523c is determined to be a value proportional to (Tq4z—the lower limit value of the dead zone).

In the embodiment, the external force rotational force estimation part 523 outputs the output value Tq5z of the process part 523c, which executes the dead zone process as described above, as an estimation value of the external force rotational force. In addition, in the embodiment, the value Tq4z obtained by the filtering process of the process part 523b corresponds to the basic value of the external force rotational force in the disclosure. Further, for example, it is also possible to omit the process of the process part 523b and input the output value Tq3z of the calculation part 523a into the process part 523c instead of Tq4z to obtain the estimation value of the external force rotational force Tq5z.

Next, the external force request target turning speed determination part 52 determines the external force request target turning speed ωz_req2 based on the estimation value of the external force rotational force Tq5z obtained as described above through the processes of process parts 524 and 525. In the process part 524, the target angular acceleration of the mobile body 1 in the yaw direction can be obtained by dividing the difference between a value, which is obtained by multiplying the estimation value Tq5z of the external force rotational force by a gain Kt having a predetermined value, and a value, which is obtained by multiplying the output value (the angular velocity) of the process part 524 by a gain Kw (the feedback value) having a predetermined value, by the inertial moment Iz in the yaw direction of the mobile body 1. Further, the turning speed (the angular velocity in the yaw direction) ωz_req20 of the mobile body 1 requested by the estimation value of the external force rotational force Tq5z can be obtained by integrating this target angular acceleration.

Further, in the process part 525, the external force request target turning speed ωz_req2 is determined by executing a limit process on the turning speed ωz_req20 obtained by the process part 524 to a value within an allowable range between the predetermined upper limit and lower limit values.

In this case, when ωz_req20 is within the allowable range, ωz_req20 is determined as the external force request turning speed ωz_req2 as it is. Further, when ωz_req20 is greater than the upper limit value or less than the lower limit value of the allowable range, the upper limit value and the lower limit value of the allowable range are determined as the external force request turning speed ωz_req2, respectively.

The target turning speed determination part 50 then executes the process of a switching process part 53. In the embodiment, basically, when the estimation value of the external force rotational force Tq5z is zero, the maneuver request turning speed ωz_req1 is determined as the target turning speed ωz_cmd, and when the estimation value of the external force rotational force Tq5z is not zero, the external force request turning speed ωz_req2 is determined as the target turning speed ωz_cmd. However, when the target turning speed ωz_cmd is switched from one of the maneuver request turning speed ωz_req1 and the external force request turning speed ωz_req2 to the other, it is preferable to smoothly change the target turning speed ωz_cmd.

Therefore, the switching process part 53 executes the process described below. The switching process part 53 executes a process of determining the value of a coefficient k1 depending on whether the estimation value of the external force rotational force Tq5z is zero by a process part 53a. In this case, when Tq5z=0, k1=1, and when Tq5z≠0, k1=0.

Then, the switching process part 53 executes a low-pass characteristic filtering process on the coefficient k1 by a process part 53b, and thereby generates a coefficient k2. Further, for example, a low-pass filter represented by a transfer function of 1/(Tb·s+1), where Tb is a time constant, may be used as the process part 53b.

Next, the switching process part 53 executes a process of multiplying the coefficient k2 by the maneuver request turning speed ωz_req1 by a calculation part 53c, and thereby calculates a corrected maneuver request turning speed ωz_req1 c. The corrected maneuver request turning speed ωz_req1 c calculated in this way matches the maneuver request turning speed ωz_req1 when the external force rotational force Tq5z is maintained at zero since k2=1. Then, when the external force rotational force Tq5z changes to a non-zero value, the corrected maneuver request turning speed ωz_req1 c gradually changes from a value matching the maneuver request turning speed ωz_req1 to zero, and is subsequently maintained at zero. After that, when the external force rotational force Tq5z becomes zero again, the corrected maneuver request turning speed ωz_req1 c gradually changes from zero to a value matching the maneuver request turning speed ωz_req1, and is subsequently maintained at the value matching the maneuver request turning speed ωz_req1.

In addition, in the embodiment, a state where the estimation value of the external force rotational force Tq5z becomes zero corresponds to a state without external force in the disclosure, and a state where the estimation value of the external force rotational force Tq5z is not zero corresponds to a state with external force in the disclosure. In addition, a state where the magnitude (the absolute value) of the estimation value of the external force rotational force Tq5z is less than a predetermined value near zero may be regarded as the state without external force, and the coefficient k1 may be set to "1" in this state. Then, a state where the magnitude (the absolute value) of the estimation value of the external force rotational force Tq5z is greater than the predetermined value may be regarded as the state with external force, and the coefficient k1 may be set to "0" in this state.

Next, the target turning speed determination part 50 executes a process of adding the corrected maneuver request turning speed ωz_req1c determined as described above and the external force request turning speed ωz_req2 by a calculation part 54, further executes a limit process of limiting the value (=ωz_req1c+ωz_req2) of this calculation result to being within a predetermined allowable range by a process part 55, and thereby determines the target turning speed ωz_cmd.

In the limit process, when (ωz_req1c+ωz_req2) is a value within the predetermined allowable range, the value is determined as the target turning speed ωz_cmd. Further, when (ωz_req1c+req2) is greater than the upper limit value or less than the lower limit value of the predetermined allowable range, the upper limit value and the lower limit value of the allowable range are determined as the target turning speed ωz_cmd, respectively.

The process of the target turning speed determination part 50 is executed as described above. In this case, in the state where the external force rotational force Tq5z is maintained at zero (the state without external force), the maneuver request turning speed ωz_req1 is determined as the target turning speed ωz_cmd.

Further, when the external force rotational force Tq5z changes to a non-zero state (the state with external force) because an external force is applied to the mobile body 1, the target turning speed ωz_cmd changes from the maneuver request turning speed ωz_req1 to gradually approach the external force request turning speed ωz_req2, and in the end the external force request turning speed ωz_req2 is determined as the target turning speed ωz_cmd.

Further, when the application of the external force to the mobile body 1 is released and the external force rotational force Tq5z returns to zero (returning to the state without external force), the target turning speed ωz_cmd changes to gradually approach the maneuver request turning speed ωz_req1, and in the end the maneuver request turning speed ωz_req1 is determined as the target turning speed ωz_cmd.

After executing the processes of the target translational speed determination part 40 and the target turning speed determination part 50 as described above, next, the movement control part 31 executes a process of determining the respective target translational speeds VwL_cmd_xy and VwR_cmd_xy of the movement operation parts 3L and 3R by the individual target translational speed determination part 60.

Figure 9:
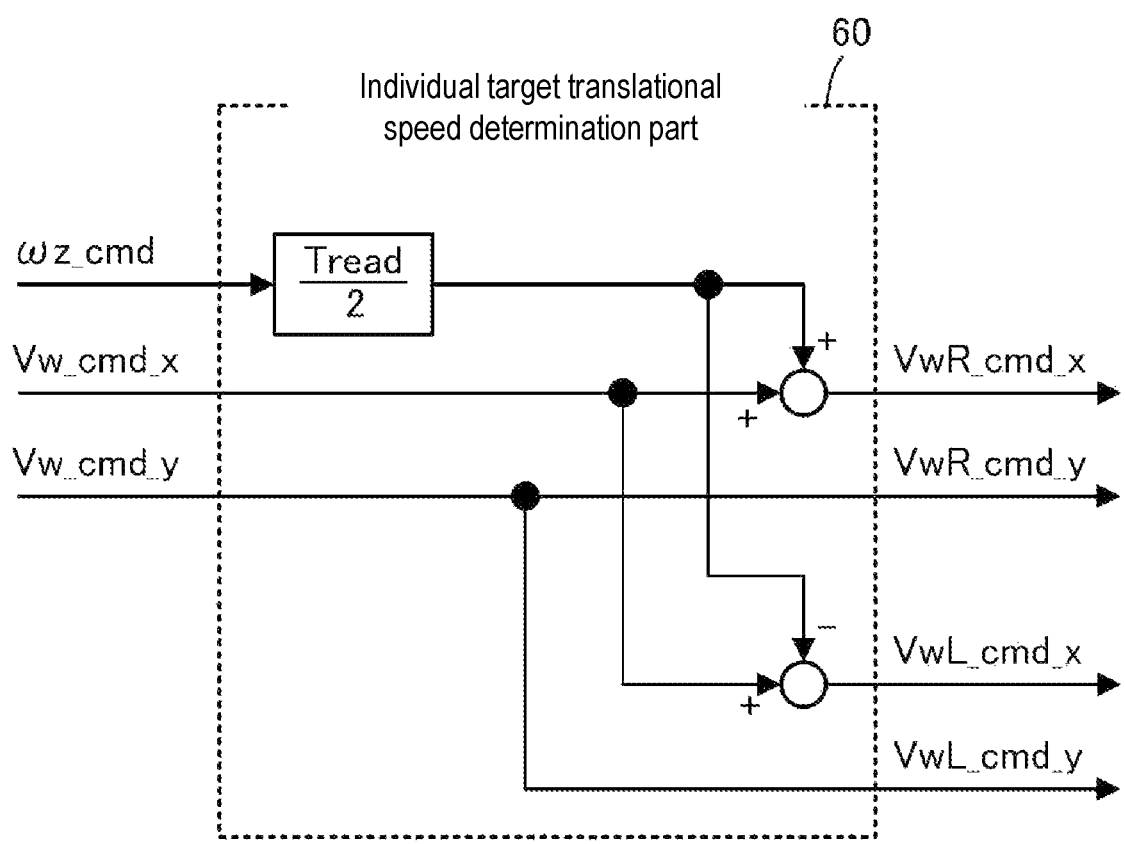
FIG. 9 is a block diagram showing a process of an individual target translational speed determination part shown in FIG. 3.

The individual target translational speed determination part 60 determines the respective target translational speeds VwL_cmd_xy and VwR_cmd_xy of the movement operation parts 3L and 3R based on the overall target translational speed Vw_cmd_xy of the movement operation parts 3L and 3R and the target turning speed ωz_cmd of the mobile body 1 by the process shown in the block diagram of FIG. 9.

That is, the individual target translational speed determination part 60 determines the target translational speed VwL_cmd_xy of the left movement operation part 3L by the following equations (8a) and (8b), and determines the target translational speed VwR_cmd_xy of the right movement operation part 3R by the following equations (8c) and (8d).

$$VwL\_cmd\_x = Vw\_cmd\_x - \omega z\_cmd \cdot (Tread/2) \quad (8a)$$

$$VwL\_cmd\_y = Vw\_cmd\_y \quad (8b)$$

$$VwR\_cmd\_x = Vw\_cmd\_x + \omega z\_cmd \cdot (Tread/2) \quad (8c)$$

$$VwR\_cmd\_y = Vw\_cmd\_y \quad (8d)$$

In the above equations (8a) and (8c), Tread is the interval between the movement operation parts 3L and 3R in the Y-axis direction as described above. By determining the target translational speeds VwL_cmd_xy and VwR_cmd_xy by the above equations (8a) to (8d), the X-axis direction target translational speeds VwL_cmd_x and VwR_cmd_x of the movement operation parts 3L and 3R are determined so that the angular velocity in the yaw direction caused by the difference (=VwR_cmd_x−VwL_cmd_x) between the X-axis direction target translational speeds VwL_cmd_x and VwR_cmd_x of the movement operation parts 3L and 3R matches the target turning speed ωz_cmd, and the average value of the X-axis direction target translational speeds VwL_cmd_x and VwR_cmd_x of the movement operation parts 3L and 3R matches the overall X-axis direction target translational speed Vw_cmd_x of the movement operation parts 3L and 3R.

Further, the Y-axis direction target translational speeds VwL_cmd_y and VwR_cmd_y of the movement operation parts 3L and 3R are determined to be speeds that match the overall Y-axis direction target translational speed Vw_cmd_y of the movement operation parts 3L and 3R.

From among the target translational speeds VwL_cmd_xy and VwR_cmd_xy determined as described above, the movement control part 31 performs the control of the operation of the electric motors 21aL and 21bL of the left movement operation part 3L according to the target translational speed VwL_cmd_xy, and performs the control of the operation of the electric motors 21aR and 21bR of the right movement operation part 3R according to the target translational speed VwR_cmd_xy.

In this case, the movement control part 31 determines, for the left movement operation part 3L, the target rotation speed of each output shaft of the electric motors 21aL and 21bL corresponding to the target translational speed VwL_cmd_xy based on correlation data (maps, calculation equations and the like) created in advance that defines the relationship between the X-axis direction and Y-axis direction translational speeds of the movement operation part 3L and the rotation speed of each output shaft of the electric motors 21aL and 21bL.

Then, the rotation speed of each output shaft of the electric motors 21aL and 21bL is controlled to the target rotation speed by executing a known speed control for each of the electric motors 21aL and 21bL according to the target rotation speed. In this way, the movement control of the left movement operation part 3L is performed to realize the target translational speed VwL_cmd_xy. The same applies to the movement control of the right movement operation part 3R.

In the mobile body 1 of the embodiment described above, when the attendant of the occupant or the occupant tries to turn the mobile body 1 by an external force without using a normal maneuver operation (in the embodiment, the weight shift of the occupant in the Y-axis direction), basically, the movement operation parts 3L and 3R are turned according to the target turning speed ωz_cmd (=ωz_req2) determined according to the external force rotational force Tq5z. Therefore, it is possible to smoothly turn the mobile body 1 by an external force.

Further, when it is changed from one of the state without external force and the state with external force to the other, since the target turning speed ωz_cmd gradually changes from one of the maneuver request turning speed ωz_req1 and the external force request turning speed ωz_req2 to the other, the behavior of movement operation parts 3L and 3R can be changed smoothly.

Further, since the external force rotational force Tq5z is estimated based on the estimation value of the movement rotational force Tq1z in the yaw direction and the estimation value of the rotational driving force Tq2z in the yaw direction by the process of the external force rotational force estimation part 523 described above, a highly reliable estimation value of the external force rotational force Tq5z can be obtained. As a result, the turning operation of the mobile body 1 according to the external force can be appropriately performed.

In addition, though the movement operation parts 3L and 3R of the mobile body 1 of the embodiment described above are movement operation parts having the structure described in Patent Document 2, each of the movement operation parts 3L and 3R is not limited to the structure described in Patent Document 2. For example, those having the structures described in PCT International Publication WO/2008/132778, PCT International Publication WO/2008/132779 or Japanese Laid-open Publication No. 2019-166863 may be adopted as the structure of each movement operation part 3 and its driving system. Alternatively, each of the movement operation parts 3L and 3R may be wheel-shaped, for example. Further, the number of movement operation parts provided in the mobile body 1 may be one or may be three or more. Further, the mobile body in the disclosure is not limited to the inverted pendulum type mobile body, and may be a mobile body having a structure in which the posture of the seat part is maintained substantially constant.

Further, in the above embodiment, the electric motors 21a and 21b are used as the actuators for driving the movement operation parts 3, but the actuators may be, for example, hydraulic actuators. Further, a sensor capable of detecting the output torque of the actuator by using a strain gauge or the like may be adopted as the sensor for detecting the operation state of each actuator.

What is claimed is:

1. A control device for a mobile body, wherein the mobile body comprises a movement operation part that is movable on a floor surface, an actuator that drives the movement operation part, a seat part for an occupant, and a base to which the movement operation part, the actuator and the seat part are assembled, the control device executes a movement control of the movement operation part of the mobile body via the actuator according at least to a maneuver operation by the occupant riding on the seat part, and control device comprises:
    a movement rotational force estimation part that obtains an observation data of a movement state of the mobile body and estimates a movement rotational force, which is a rotational force balanced with an inertial force in a yaw direction caused by a movement of the mobile body, based on the observation data;
    a rotational driving force estimation part that obtains the observation data of a driving force output by the actuator or a state quantity related to the driving force and estimates a rotational driving force in the yaw direction applied from the actuator to the movement operation part based on the observation data;
    an external force rotational force estimation part that estimates an external force rotational force, which is a rotational force due to an external force applied to the mobile body, by using the movement rotational force estimated by the movement rotational force estimation part and the rotational driving force estimated by the rotational driving force estimation part; and
    a movement control part that performs the movement control of the movement operation part via the actuator so that a turning operation of the movement operation part is performed according to the external force rotational force estimated by the external force rotational force estimation part and the maneuver operation by the occupant.

2. The control device for the mobile body according to claim 1,
    wherein the external force rotational force estimation part is configured to obtain an estimation value of the external force rotational force by:
        a process of obtaining a difference between the movement rotational force estimated by the movement rotational force estimation part and the rotational driving force estimated by the rotational driving force estimation part, or a value obtained by executing a low-pass characteristic filtering process on the difference, as a basic value of the external force rotational force; and
        a dead zone process of setting the estimation value of the external force rotational force to zero when the basic value is a value within a predetermined dead zone and setting a value determined according to a deviation amount of the basic value as the estimation value of the external force rotational force when the basic value is a value deviating from the dead zone.

3. The control device for the mobile body according to claim 2,
    wherein the external force rotational force estimation part is configured to further have a function of variably setting the dead zone according to observation data of a yaw rate of the mobile body.

4. The control device for the mobile body according to claim 3, wherein the movement control part is configured to:
    execute an operation control of the actuator according to a target turning speed of the mobile body determined according to the maneuver operation by the occupant in a state without external force where the external force rotational force estimated by the external force rotational force estimation part is zero, or where a magnitude of the external force rotational force is less than a predetermined value, and
    execute the operation control of the actuator according to the target turning speed of the mobile body determined according to the external force rotational force in a state with external force where the external force rotational force estimated by the external force rotational force estimation part is not zero, or where a magnitude of the external force rotational force is greater than a predetermined value.

5. The control device for the mobile body according to claim 4, wherein the movement control part is configured to execute the operation control of the actuator according to the target turning speed while determining the target turning speed of the mobile body to be gradually changed when a state of the external force rotational force estimated by the external force rotational force estimation part changes from one of the state without external force and the state with external force to the other.

6. The control device for the mobile body according to claim 5, wherein the mobile body is an inverted pendulum mobile body comprising a plurality of the movement operation parts that are movable in all directions on the floor surface and the riding part that is assembled to the base to be tiltable in a vertical direction.

7. The control device for the mobile body according to claim 4, wherein the mobile body is an inverted pendulum mobile body comprising a plurality of the movement operation parts that are movable in all directions on the floor surface and the riding part that is assembled to the base to be tiltable in a vertical direction.

8. The control device for the mobile body according to claim 3, wherein the mobile body is an inverted pendulum mobile body comprising a plurality of the movement operation parts that are movable in all directions on the floor surface and the riding part that is assembled to the base to be tiltable in a vertical direction.

9. The control device for the mobile body according to claim 2, wherein the movement control part is configured to:
execute an operation control of the actuator according to a target turning speed of the mobile body determined according to the maneuver operation by the occupant in a state without external force where the external force rotational force estimated by the external force rotational force estimation part is zero, or where a magnitude of the
external force rotational force is less than a predetermined value, and execute the operation control of the actuator according to the target turning speed of the mobile body determined according to the external force rotational force in a state with external force where the external force rotational force estimated by the external force rotational force estimation part is not zero, or where a magnitude of the external force rotational force is greater than a predetermined value.

10. The control device for the mobile body according to claim 9, wherein the movement control part is configured to execute the operation control of the actuator according to the target turning speed while determining the target turning speed of the mobile body to be gradually changed when a state of the external force rotational force estimated by the external force rotational force estimation part changes from one of the state without external force and the state with external force to the other.

11. The control device for the mobile body according to claim 10, wherein the mobile body is an inverted pendulum mobile body comprising a plurality of the movement operation parts that are movable in all directions on the floor surface and the riding part that is assembled to the base to be tiltable in a vertical direction.

12. The control device for the mobile body according to claim 9, wherein the mobile body is an inverted pendulum mobile body comprising a plurality of the movement operation parts that are movable in all directions on the floor surface and the riding part that is assembled to the base to be tiltable in a vertical direction.

13. The control device for the mobile body according to claim 2, wherein the mobile body is an inverted pendulum mobile body comprising a plurality of the movement operation parts that are movable in all directions on the floor surface and the riding part that is assembled to the base to be tiltable in a vertical direction.

14. The control device for the mobile body according to claim 1, wherein the movement control part is configured to:
execute an operation control of the actuator according to a target turning speed of the mobile body determined according to the maneuver operation by the occupant in a state without external force where the external force rotational force estimated by the external force rotational force estimation part is zero, or where a magnitude of the external force rotational force is less than a predetermined value, and
execute the operation control of the actuator according to the target turning speed of the mobile body determined according to the external force rotational force in a state with external force where the external force rotational force estimated by the external force rotational force estimation part is not zero, or where a magnitude of the external force rotational force is greater than a predetermined value.

15. The control device for the mobile body according to claim 14, wherein the movement control part is configured to execute the operation control of the actuator according to the target turning speed while determining the target turning speed of the mobile body to be gradually changed when a state of the external force rotational force estimated by the external force rotational force estimation part changes from one of the state without external force and the state with external force to the other.

16. The control device for the mobile body according to claim 15, wherein the mobile body is an inverted pendulum mobile body comprising a plurality of the movement operation parts that are movable in all directions on the floor surface and the riding part that is assembled to the base to be tiltable in a vertical direction.

17. The control device for the mobile body according to claim 14, wherein the mobile body is an inverted pendulum mobile body comprising a plurality of the movement operation parts that are movable in all directions on the floor surface and the riding part that is assembled to the base to be tiltable in a vertical direction.

18. The control device for the mobile body according to claim 1, wherein the mobile body is an inverted pendulum mobile body comprising a plurality of the movement operation parts that are movable in all directions on the floor surface and the riding part that is assembled to the base to be tiltable in a vertical direction.

* * * * *